United States Patent
Nakao et al.

(10) Patent No.: US 11,387,862 B2
(45) Date of Patent: *Jul. 12, 2022

(54) BASE STATION AND COMMUNICATION METHOD

(71) Applicant: Sun Patent Trust, New York, NY (US)

(72) Inventors: Seigo Nakao, Osaka (JP); Hidetoshi Suzuki, Kanagawa (JP); Daichi Imamura, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,444

(22) Filed: Feb. 19, 2021

(65) Prior Publication Data

US 2021/0184725 A1 Jun. 17, 2021

Related U.S. Application Data

(63) Continuation of application No. 16/738,355, filed on Jan. 9, 2020, now Pat. No. 10,958,305, which is a
(Continued)

(30) Foreign Application Priority Data

Dec. 10, 2008 (JP) .................. 2008-314791

(51) Int. Cl.
*H04B 1/00* (2006.01)
*H04B 1/7143* (2011.01)
(Continued)

(52) U.S. Cl.
CPC .......... *H04B 1/7143* (2013.01); *H04B 7/024* (2013.01); *H04J 11/0053* (2013.01); *H04J 13/22* (2013.01)

(58) Field of Classification Search
CPC ....... H04B 1/7143; H04B 7/024; H04J 13/22; H04J 11/0053; H04L 1/0026; H04L 5/0032
(Continued)

(56) References Cited

U.S. PATENT DOCUMENTS 5,870,391 A 2/1999 Nago
6,061,389 A 5/2000 Ishifuji et al.
(Continued)

FOREIGN PATENT DOCUMENTS

JP 2008-172356 A 7/2008
JP 2008-172357 A 7/2008
(Continued)

OTHER PUBLICATIONS

3GPP TSG RAN WG1 Meeting #49, "Multiplexing capability of CQIs and ACK/NACKs from different UEs," Nokia Siemens Networks, Nokia, R1-072315, May 7-11, 2007, pp. 1-4.
(Continued)

*Primary Examiner* — Helene E Tayong
(74) *Attorney, Agent, or Firm* — Seed IP Law Group LLP

(57) ABSTRACT

A wireless communication terminal apparatus wherein CoMP communication can normally be performed without increasing the overhead of an upstream line control channel. In this apparatus, a spreading unit (214) primarily spreads a response signal by use of a ZAC sequence established by a control unit (209). A spreading unit (217) secondarily spreads the response signal, to which CP has been added, by use of a block-wise spread code sequence established by the control unit (209). The control unit (209) controls, in accordance with sequence numbers and a hopping pattern established therein, the circular shift amount of the ZAC sequence to be used for the primary spread in the spreading unit (214) and the block-wise spread code sequence to be used for the
(Continued)

secondary spread in the spreading unit (217). The hopping pattern established in the control unit (209) is a hopping pattern common to a plurality of base stations that CoMP-receive the response signal.

18 Claims, 14 Drawing Sheets

Related U.S. Application Data continuation of application No. 16/176,001, filed on Oct. 31, 2018, now Pat. No. 10,574,291, which is a continuation of application No. 15/787,205, filed on Oct. 18, 2017, now Pat. No. 10,158,398, which is a continuation of application No. 15/205,302, filed on Jul. 8, 2016, now Pat. No. 9,831,911, which is a continuation of application No. 13/133,286, filed as application No. PCT/JP2009/006729 on Dec. 9, 2009, now Pat. No. 9,425,916.

(51) Int. Cl.
  *H04B 7/024* (2017.01)
  *H04J 11/00* (2006.01)
  *H04J 13/22* (2011.01)

(58) Field of Classification Search
  USPC .......................................................... 375/133
  See application file for complete search history.

(56) References Cited

U.S. PATENT DOCUMENTS

| | | |
|---|---|---|
| 6,937,558 B2 | 8/2005 | Wakutsu |
| 7,904,778 B2 | 3/2011 | Yamada et al. |
| 7,957,759 B2 | 6/2011 | Papasakellariou |
| 8,169,950 B2 | 5/2012 | Shen et al. |
| 8,169,992 B2 | 5/2012 | Parkvall et al. |
| 8,498,649 B2 | 7/2013 | Seo et al. |
| 2004/0070490 A1 | 4/2004 | Taki et al. |
| 2005/0136882 A1 | 6/2005 | Boulton |
| 2005/0278420 A1 | 12/2005 | Hartikainen et al. |
| 2006/0104334 A1 | 5/2006 | Hervey, Jr. et al. |
| 2008/0095106 A1 | 4/2008 | Malladi et al. |
| 2008/0095108 A1 | 4/2008 | Malladi et al. |
| 2008/0298433 A1 | 12/2008 | Tiirola et al. |
| 2008/0318608 A1 | 12/2008 | Inoue et al. |
| 2009/0080500 A1 | 3/2009 | Muharemovic et al. |
| 2009/0092148 A1 | 4/2009 | Zhang et al. |
| 2009/0207797 A1 | 8/2009 | Shen et al. |
| 2010/0034165 A1 | 2/2010 | Han et al. |
| 2010/0067464 A1 | 3/2010 | Higuchi |
| 2010/0067613 A1 | 3/2010 | Park et al. |
| 2010/0099431 A1 | 4/2010 | Sampath et al. |
| 2010/0111142 A1 | 5/2010 | Iwai et al. |
| 2010/0195702 A1 | 8/2010 | Nakao et al. |
| 2011/0286543 A1 | 11/2011 | Nakao et al. |
| 2011/0305226 A1 | 12/2011 | Zhang et al. |
| 2013/0077656 A1 | 3/2013 | Iwai et al. |

FOREIGN PATENT DOCUMENTS

| | | |
|---|---|---|
| WO | 2008/033985 A2 | 3/2008 |
| WO | 2008/111317 A1 | 9/2008 |

OTHER PUBLICATIONS

3GPP TSG RAN WG1 Meeting #50, "Randomization of intra-cell interference in PUCCH," ETRI, R1-073412, Aug. 20-24, 2007, pp. 1-6.

3GPP TSG-RAN WG1 #55, "Coordinated Multi-Point downlink transmission in LTE-Advanced," Qualcomm Europe, R1-084400, Nov. 10-15, 2008, pp. 1-5.

3GPP TSG-RAN1 #56-BIS, "Efficient HARQ Protocol for SIC based DL CoMP," Fujitsu, R1-091496 Mar. 23-27, 2009, pp. 1-17.

3GPP TS 36.211 V8.4.0, "3rd Generation Partnership Project; Technical Specification Group Radio Access Network; Evolved Universal Terrestrial Radio Access (E-UTRA); Physical Channels and Modulation (Release 8)," Sep. 2008, pp. 1-78.

3GPP TSG RAN1 #53, "UL DM RS Remaining Issues," Motorola, R1-081924, May 5-9, 2008, pp. 1-2.

English translation of the Search Report which is an annex of the Chinese Office Action dated Mar. 25, 2014.

Extended European Search Report, dated Apr. 13, 2017.

International Search Report dated Jan. 12, 2010.

Panasonic, "Cell Specific Cyclic Shift Hopping V.S UE specific Cyclic Shift Hopping for Uplink ACK/NACK Signals", 7.2.4 Uplink Control Channel, Discussion and Decision, 3GPP TSG RAN WG1 Meeting #50, R1-073619, pp. 1-4, Aug. 20-24, 2007, Athens, Greece.

S. Nakao, et al., "Performance improvement of Evolved UTRA uplink control channel for fast fading environments," IEICE Technical Report, RCS2008-61, vol. 108, No. 188, Aug. 20, 2008, pp. 49-55, with English abstract.

Z. He, et al., "Sub-carrier allocation combined with coordinated multi-point transmission in multi-cell OFDMA system," IEEE International Conference on Network Infrastructure and Digital Content, Nov. 6-8, 2009, pp. 842-846.

BASE STATION AND COMMUNICATION METHOD

TECHNICAL FIELD

The present invention relates to a radio communication terminal apparatus, radio communication base station apparatus, and response signal spreading method.

BACKGROUND ART

In 3GPP LTE, SC-FDMA (Single-Carrier Frequency Division Multiple Access) is employed as an uplink communication method (see Non-patent Literature 1). In 3GPP LTE, a radio communication base station apparatus (hereinafter simply referred to as "base station") allocates resources for uplink data to a radio communication terminal apparatus (hereinafter simply referred to as "terminal") through a physical channel (for example, PDCCH (Physical Downlink Control Channel)).

Also, in 3GPP LTE, HARQ (Hybrid Automatic Repeat reQuest) is applied to downlink data from a base station to a terminal. Thus, a terminal feeds back to a base station a response signal showing an error detection result of downlink data. A terminal performs a CRC (Cyclic Redundancy Check) check for downlink data, feed backs ACK (Acknowledgment) if the result of CRC is OK (no error), and feed backs NACK (Negative Acknowledgment) if the result of CRC is NG (error present), as a response signal towards a base station. A terminal transmits this response signal (that is, an ACK/NACK signal) using, for example, an uplink control channel such as a PUCCH (Physical Uplink Control Channel), to a base station.

FIG. 1 shows a resource arrangement of a PUCCH in 3GPP LTE. A PUSCH (Physical Uplink Shared Channel) shown in FIG. 1 is a channel used for a terminal to transmit uplink data, and is used when a terminal transmits uplink data. As shown in FIG. 1, a PUCCH is placed for both ends of a system band, that is, resource blocks (RB: Resource Block, or PRB: Physical RB) on both ends of a system band. The PUCCH placed for both ends of a system band switches between slots. That is to say a frequency hopping is performed per slot.

As shown in FIG. 2, studies are underway to code-multiplex multiple response signals from multiple terminals by spreading with a ZAC (Zero Auto Correlation) sequence and a Walsh sequence (see Non-patent Literature 2). In FIG. 2, [$W_0$, $W_1$, $W_2$, $W_3$] represents a Walsh sequence of a sequence length of 4. As shown in FIG. 2, in a terminal, a response signal of ACK or NACK is subjected to the first spreading using a sequence which has a characteristic becoming a ZAC sequence (sequence length 12) in the frequency domain and in the time domain at first. Next, response signals after the first spreading are associated with each $W_0$-$W_3$ and are subjected to an IFFT (Inverse Fast Fourier Transform). A response signal spread in the frequency domain is transformed by this IFFT into a ZAC sequence which has a sequence length of 12 in the time domain. Also, a signal after the IFFT is further subjected to second spreading using a Walsh sequence (sequence length 4). Thus, one response signal is placed for four SC-FDMA symbols $S_0$-$S_3$. This applies to other terminals alike, and a response signal is spread using a ZAC sequence and a Walsh sequence. However, different terminals use ZAC sequences of different cyclic shift amounts in the time domain or use different Walsh sequences. Since the sequence length of a ZAC sequence in the time domain is 12 here, twelve ZAC sequences generated from the same ZAC sequence and having cyclic shift amounts 0-11, can be used. Since the sequence length of a Walsh sequence is 4, four mutually different Walsh sequences can be used. Thus, in an ideal communication environment, response signals from maximum 48 (12×4) terminals can be code-multiplexed.

As shown in FIG. 2, studies are underway to code-multiplex multiple the reference signals (a pilot signal) from multiple terminals (see Non-patent Literature 2). As shown in FIG. 2, to generate a reference signal of three symbols $R_0$, $R_1$ and $R_2$ from a ZAC sequence (sequence length 12), first, the ZAC sequence is subjected to an IFFT in association with an orthogonal sequence of a sequence length of 3, [$F_0$, $F_1$, $F_2$], such as a Fourier sequence. By this IFFT, a ZAC sequence which is a sequence length of 12 in the time domain is acquired. Then, a signal after the IFFT is spread using an orthogonal sequence [$F_0$, $F_1$, $F_2$]. Thus, one reference signal (ZAC sequence) is allocated to three SC-FDMA symbols, $R_0$, $R_1$, and $R_2$. This applies to other terminals alike, and one reference signal (a ZAC sequence) is allocated to three SC-FDMA symbols, $R_0$, $R_1$, and $R_2$. However, different terminals use ZAC sequences of different cyclic shift amounts in the time domain or use different orthogonal sequences. Since the sequence length of a ZAC sequence in the time domain is 12 here, twelve ZAC sequences generated from the same ZAC sequence and having cyclic shift amounts 0-11, can be used. Since the sequence length of an orthogonal sequence is 3, three mutually different orthogonal sequences are used. Thus, in an ideal communication environment, reference signals from maximum 36 (12×3) terminals can be code-multiplexed.

As shown in FIG. 2, seven symbols of $S_0$, $S_1$, $R_0$, $R_1$, $R_2$, $S_2$, and $S_3$ form one slot.

Here, the cross-correlation between ZAC sequences of different cyclic shift amounts which are generated from the same ZAC sequence, becomes almost zero. Thus, in an ideal communication environment, multiple response signals, which are spread and code-multiplexed using ZAC sequences (cyclic shift amount 0-11) of different cyclic shift amounts, can be separated in the time domain nearly without inter symbol interference by a correlation processing in a base station.

However, because of influences such as a misalignment of transmitting timing at a terminal and a delayed wave caused by multipath, multiple response signals from multiple terminals may not arrive at to a base station at the same time. For example, if transmission timing of a response signal spread using the ZAC sequence of cyclic shift amount 0 is later than the correct timing, the correlation peak of the ZAC sequence of cyclic shift amount 0 may appear in a detecting window for a ZAC sequence of cyclic shift amount 1. If a response signal which has been spread using the ZAC sequence of cyclic shift amount 0 has a delayed wave, an interference leakage due to the delayed wave may appear in a detecting window for a ZAC sequence of cyclic shift amount 1. Thus, in these cases, a ZAC sequence of cyclic shift amount 1 suffers interference from a ZAC sequence of cyclic shift amount 0. On the other hand, if transmission timing of a response signal spread using the ZAC sequence of cyclic shift amount 0 is earlier than the correct timing, the correlation peak of the ZAC sequence of cyclic shift amount 1 may appear in a detecting window for a ZAC sequence of cyclic shift amount 0. Thus, in this case, a ZAC sequence of cyclic shift amount 0 suffers interference from a ZAC sequence of cyclic shift amount 1. Thus, in this case, the separation characteristics of a response signal spread using the ZAC sequence of cyclic shift amount 0 and a response signal spread by a ZAC sequence of cyclic shift amount 1 are degraded. Thus, if ZAC sequences having mutually adjacent cyclic shift amounts are used, the separation characteristic of a response signal may be degraded.

Thus, previously, if multiple response signals are code-multiplexed by ZAC sequence spreading, a cyclic shift interval (a gap between cyclic shift amounts) of such a scale that does not produce inter symbol interference between ZAC sequences, is provided between ZAC sequences. For example, if the cyclic shift interval between ZAC sequences is defined as 2, between twelve sequences which have a sequence length of 12 and which have cyclic shift amounts 0-11, only six ZAC sequences of cyclic shift amounts 0, 2, 4, 6, 8, and 10, or of cyclic shift amounts 1, 3, 5, 7, 9, and 11, are used for the first spreading of a response signal. Thus, if a Walsh sequence which has a sequence length of 4 is used for second spreading of a response signal, response signals from maximum 24 (6×4) terminals can be code-multiplexed.

However, as shown in FIG. 2, the sequence length of an orthogonal sequence used to spread a reference signal is 3, so that only three mutually different orthogonal sequences can be used to spread a reference signal. Thus, if multiple response signals are separated using a reference signal shown in FIG. 2, only response signals from maximum 18 (6×3) terminals can be code-multiplexed. Thus, three out of four Walsh sequences which have a sequence length of 4 are enough, so that one Walsh sequence remains unused.

Also, as a PUCCH to be used to transmit to the above mentioned eighteen response signals, studies are underway to define eighteen PUCCHs (ACK #1-ACK #18 shown in FIG. 3) shown in FIG. 3. In FIG. 3, the horizontal axis represents the cyclic shift amount, and the vertical axis represents the sequence numbers of orthogonal code sequences (sequence numbers of a Walsh sequence or a Fourier sequence).

To reduce interference from other cells in PUCCH, a technology called cyclic shift hopping is discussed (see Non-patent Literature 3). Cyclic shift hopping refers to a technology of cyclically shifting, for example, the eighteen resources (ACK #1-ACK #18) shown in FIG. 3, in SC-FDMA symbol units (in FIG. 4, symbol 0, 1, 2, ..., n), using the cell-specific cyclic shift hopping pattern as shown in FIG. 4, maintaining their correlation relationships on a cyclic shift axis and on an orthogonal code axis. As shown in FIG. 4, although the amount of cyclic shift which resources to which a certain response signal is allocated use changes per SC-FDMA symbol, the relative relationships of resources (cyclic shift amount and orthogonal code) under the same time and the same frequency are maintained in a cell, so that these eighteen resources are orthogonal to each other. This can randomize the combination of response signals to suffer severe interference from other cells, so that no longer do some terminals alone continue suffering severe interference from other cells. Generally, different ZAC sequences are allocated to different cells, so that the ZAC sequence differences between cells contribute to randomization of interference.

Meanwhile, in a PUCCH of 3GPP LTE the above mentioned response signal (an ACK/NACK signal) and also a CQI (Channel Quality Indicator) signal are multiplexed. Although a response signal is an one-symbol of information (information indicated by using one symbol) as mentioned above, a CQI signal is a five-symbol of information (information indicated by using five symbols). As shown in FIG. 5, a terminal spreads a CQI signal using a ZAC sequence which has a sequence length of 12, and performs an IFFT on the spread CQI signal, and transmits the CQI signal. By this means, a Walsh sequence is not applied for a CQI signal, so that, in a base station, a Walsh sequence cannot be used to separate a response signal and a CQI signal. Therefore, using a ZAC sequence, a base station despreads a response signal and CQI signal which have been spread by the ZAC sequences corresponding to different cyclic shifts, so that a base station can separate a response signal and CQI signal nearly without inter symbol interference.

Like response signals, studies are underway to apply cyclic shift hopping to CQI signals in SC-FDMA units, using cell specific cyclic shift hopping pattern to randomize inter-cell interference. As shown in FIG. 6, although the amount of cyclic shift which resources to which a certain CQI signal is allocated use changes per SC-FDMA symbol, the relative relationships of the amount of cyclic shift under the same time and the same frequency are maintained. Like response signals, different ZAC sequences are allocated to different cells of CQI signals, so that the ZAC sequence differences between cells contribute to randomization of interference.

In 3GPP LTE, the cyclic shift hopping patterns shown in FIG. 4 and FIG. 6 are associated with the cell IDs of base stations one by one.

Also, the standardization of LTE-advanced (hereinafter referred to as "LTE+") has been started to realize much faster communication than 3GPP LTE. In LTE+, to improve average throughput and improve throughput of a terminal located near a cell edge, CoMP transmission/reception (Co-ordinated Multipoint Transmission/Reception) where multiple base stations cooperate to transmit and receive signals and coordinate inter-cell interference, is discussed.

CITATION LIST

Non-Patent Literature

NPL 1
3GPP TS 36.211 V8.4.0, "Physical Channels and Modulation (Release 8)," September 2008
NPL 2
Multiplexing capability of CQIs and ACK/NACKs form different UEs (ftp://ftp.3gpp.org/TSG_RAN/WG1_RL1/TSGR1_49/Docs/R1-072315.zip)
NPL 3
Randomization of intra-cell interference in PUCCH (ftp://ftp.3gpp.org/TSG_RAN/WG1_RL1/TSGR1_50/Docs/R1-073412.zip)

SUMMARY OF INVENTION

Technical Problem

For example, FIG. 7 shows a case where multiple base stations receive an uplink response signal from one terminal (that is, CoMP reception). In FIG. 7, a base station (serving eNB) to which a certain terminal (UE 1) belongs transmits downlink data to UE 1. Also, UE 1 transmits a response signal (desired ACK/NACK shown in FIG. 7) to downlink data. Then, as shown in FIG. 7, three base stations—the serving eNB and other base stations (neighbor eNB 1 and neighbor eNB 2)—receive the response signal from UE 1 in CoMP reception. Here, a group of multiple base stations to receive response signals from a terminal by CoMP reception is referred to as a CoMP group. The three base stations shown in FIG. 7 exchange through backhaul, analog information (soft bit information) of the response signals from UE 1 which the base station each have received from UE 1.

The serving eNB combines analog information of the response signal which has been received in the three base stations by, for example, MRC (Maximum Ratio Combining), and decodes the response signal. Also, the serving eNB performs retransmit control of downlink data to UE 1, based on a decoded response signal.

Also, FIG. 8 shows a case where multiple base stations transmit downlink data (reference signal) to one terminal (that is, CoMP transmission), a terminal transmits a CQI signal generated by using the reference signal transmitted from the multiple base stations in CoMP transmission, and the multiple base stations receive the CQI signal from the terminal in CoMP reception. In FIG. 8, three base stations which join the same CoMP group (serving eNB, neighbor eNB 1, and neighbor eNB 2) transmit the same downlink data (reference signal) to UE 1 belonging to the serving eNB in CoMP transmission. UE 1 estimates downlink quality between UE 1 and each base station using a received reference signal, and transmits CQI information showing each downlink quality to each base station. However, UE 1 transmits CQI information for three base stations all together in one CQI signal (a desired CQI shown in FIG. 8). The three base stations shown in FIG. 8 each receive a CQI signal from UE 1 in CoMP reception. Here, as in FIG. 7, three base stations exchange through backhaul analog information (soft bit information) of the CQI signals which the base station each have received. The serving eNB combines analog information of the CQI signal which has been received in the three base stations by, for example, MRC (Maximum Ratio Combining), and decodes the CQI signal. Also, the serving eNB controls MCS (Modulation and Coding Scheme) of downlink data to transmit from each base station, or a spatial multiplexing, based on a decoded CQI signal, that is, the downlink quality between UE 1 and each base station.

Here, in FIG. 7 and FIG. 8, the three base stations to receive a control signal from UE 1 (a response signal or a CQI signal) in CoMP reception, also receive a control signal (a response signal or a CQI signal) from UE 2, which uses eNB 2 as the serving eNB, in CoMP reception. Thus, in FIG. 7 and FIG. 8, three base stations join the same CoMP group, receives control signals from two terminals in CoMP reception.

However, as mentioned above, to randomize inter-signal interference between control signals transmitted from terminals belonging to respective cells, ZAC sequences that vary per cell and cell-specific hopping patterns are used. For example, in FIG. 7 and FIG. 8, UE 1 belonging to the serving eNB and UE 2 belonging to the neighbor eNB 2 use mutually different ZAC sequences and hopping patterns. Thus, the control signals from UE 1 (a response signal and a CQI signal) and the control signals from UE 2 (a response signal and a CQI signal) are not orthogonal and interfere with each other.

Thus, for example, a response signal from UE 1 shown in FIG. 7 is transmitted using a ZAC sequence and hopping pattern that are specific to a serving eNB, and a response signal from UE 2 is transmitted using a ZAC sequence and hopping pattern that are specific to a neighbor eNB 2. Therefore, in the neighbor eNB 2, a response signal from UE 1 and a response signal from UE 2 are not orthogonal to each other and interfere with each other. Thus, this raises a problem that a response signal from UE 1 and a response signal from UE 2 interfere with each other and cause deterioration of CoMP quality.

Even when multiple terminals use the same CoMP group, if the serving eNB is differed per each terminal, the above mentioned problem can be solved by separating time and frequency resources to use as a control channel (for example, PUCCH). However, in this case, the overhead of an uplink control channel used for CoMP communication will increase.

It is therefore an object of the present invention to provide a terminal, a base station, and a signal spreading method which allows efficient CoMP communication without increasing an overhead of an uplink control channel.

Solution to Problem

The terminal of the present invention employs a configuration having: a first spreading section that performs first spreading of a signal using one of a plurality of first sequences that can be separated from each other; and a control section that controls a first sequence to be used in the first sequence section according to a hopping pattern for a plurality of channels that are defined by the plurality of first sequences, where the hopping pattern is a common hopping pattern between a plurality of radio communication base station apparatuses that receive the signal in coordinated multipoint reception.

The base station of the present invention employs a configuration having: a correlation processing section that calculates a correlation value between a signal from a radio communication terminal apparatus and a first sequence used for first spreading in the radio communication terminal apparatus, using a hopping pattern for a plurality of channels defined by a plurality of first sequence that can be separated from each other; and a combining section that combines the correlation value and a correlation value of the signal received by other radio communication base station apparatus which receives the signal in coordinated multipoint reception, where the hopping pattern is a common hopping pattern between the plurality of radio communication terminal apparatuses that receive the signal in coordinated multipoint reception.

The signal spreading method of the present invention includes: a first spreading step of performing first spreading for a signal using one of a plurality of first sequences that can be separated from each other; and a control step of controlling a first sequence to be used in the first spreading section according to a hopping pattern for a plurality of channels that are defined by the plurality of first sequences, where the hopping pattern is a common hopping pattern between a plurality of radio communication base station apparatuses that receive the signal in coordinated multipoint reception.

Advantageous Effects of Invention

According to the present invention, without increasing an overhead of uplink control channel, CoMP communication can be performed.

DESCRIPTION OF EMBODIMENTS

Now, embodiments of the present invention will be explained in detail with reference to the accompanying drawings.

(Embodiment 1)

Figure 9:
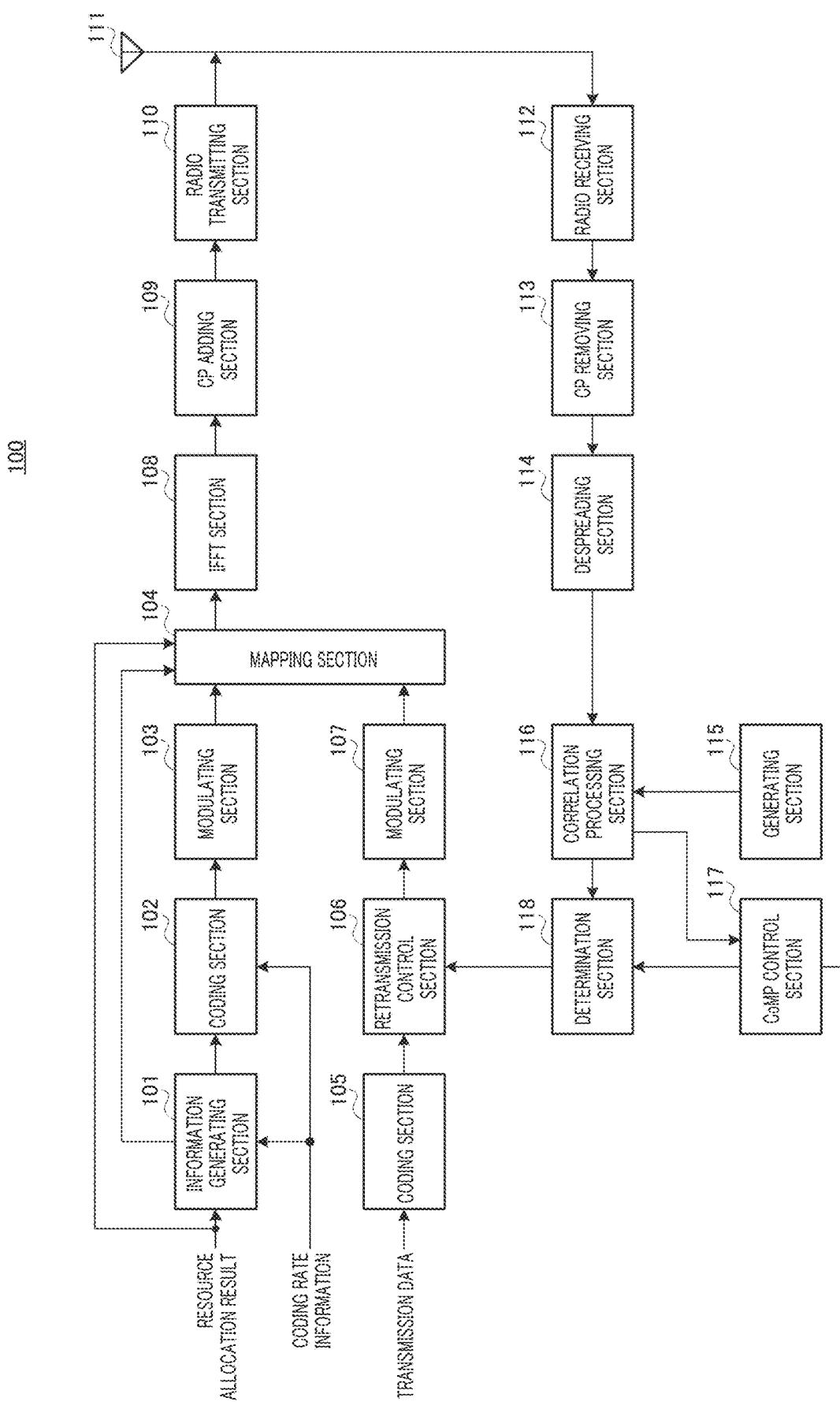
FIG. 9 is a block diagram showing a configuration of a base station according to embodiment 1 of the present invention.
Figure 10:
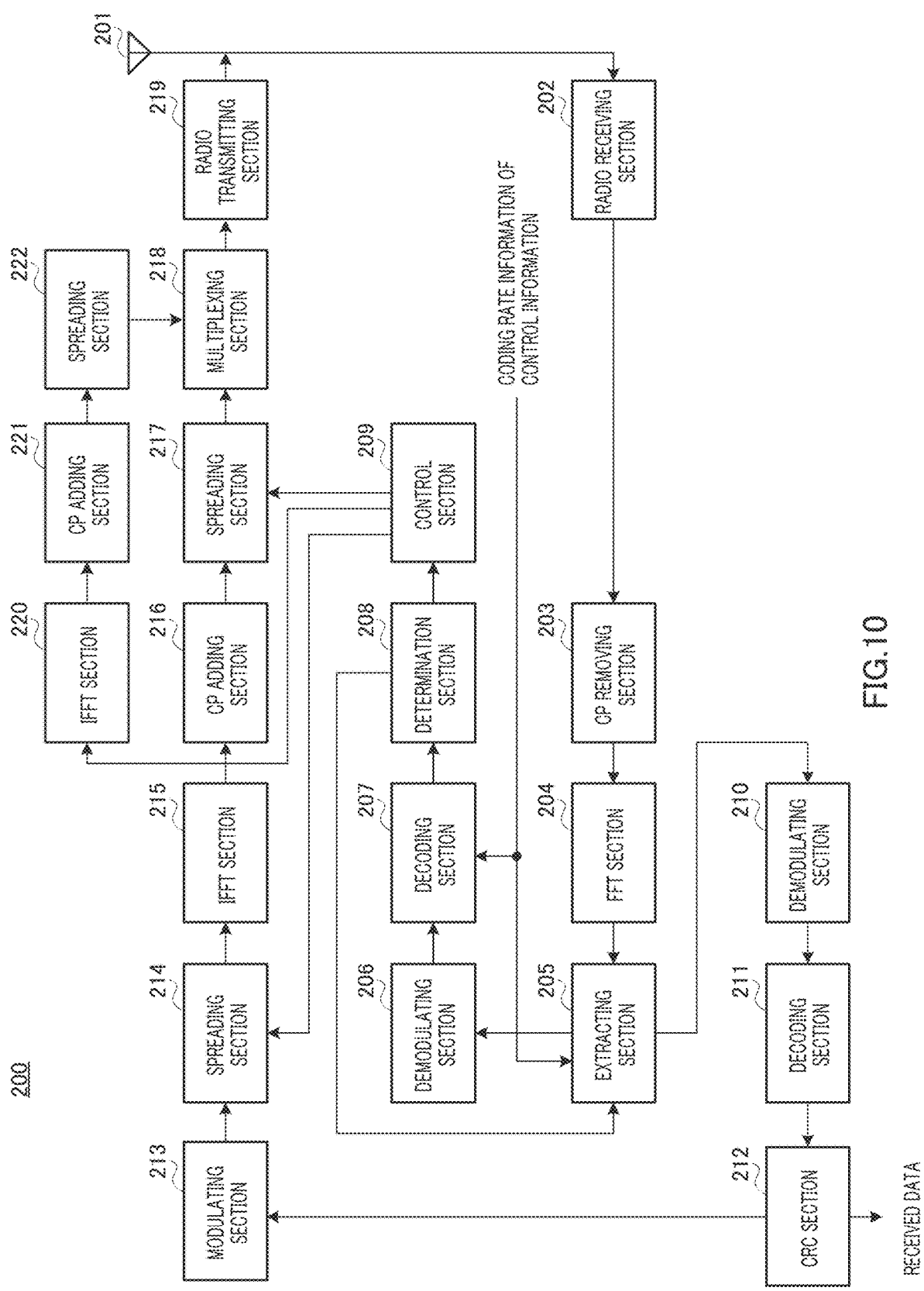
FIG. 10 is a block diagram showing a configuration of a terminal according to embodiment 1 of the present invention.

FIG. 9 shows a configuration of base station 100 according to the present embodiment, and FIG. 10 shows a configuration of terminal 200 according to the present embodiment.

Here, to avoid complicated explanation, FIG. 9 shows only components pertaining to a transmission of downlink data and a reception in an uplink of the response signal associated with the downlink data, to which the present invention is closely related, and illustration and description of parts or components pertaining to uplink data reception are omitted. In the same way, FIG. 10 shows only components pertaining to a reception of downlink data and a transmission in an uplink of the response signal associated with the downlink data, to which the present invention is closely related, and illustration and description of parts or components pertaining to uplink data reception are omitted.

Then, in the following explanation, a case will be explained where a ZAC sequence is used for the first spreading and a blockwise spreading code sequence is used for second spreading. However, for the first spreading, besides ZAC sequences, it is equally possible to use sequences that have mutually different amounts of cyclic shift and are separable. For example, a PN sequence, such as a GCL (Generalized Chirp like) sequence, a CAZAC (Constant Amplitude Zero Auto Correlation) sequence, a ZC (Zadoff-Chu) sequence, an M sequence, and an orthogonal Gold code sequence, or a sequence which is generated randomly by a computer and which has steep auto-correlation characteristics, may be used for the first spreading. Also, for second spreading, any sequences may be used as blockwise spreading code sequences as long as the sequences are mutually orthogonal or the sequences can be identified as nearly mutually orthogonal. For example, a Walsh sequence or Fourier sequence may be used for second spreading as a blockwise spreading code sequence.

Also, in the following explanation, the response signal resources (for example, PUCCH or PRB) are determined by the cyclic shift amount of ZAC sequence and the sequence number of a blockwise spreading code sequence.

Also, in the following explanation, IDs (hereinafter referred to as "special IDs") that are set on a per CoMP group basis are associated with time and frequency resources (for example, PRBs) for uplink response signal transmission. Special IDs are adjusted in advance between multiple base stations joining the same CoMP group. Also, when communicating with terminals, each base station reports to each terminal whether or not a response signal from that terminal is to be received in CoMP reception. Each base station also reports the special ID associated with the CoMP group that the base station joins, to a terminal that transmits a response signal to be received in CoMP reception. Each base station also reports its cell ID to a terminal belonging to the base station. Here, the bit number of special ID and the bit number of cell ID is equal.

Base station 100 shown in FIG. 9 reports to each terminal in advance information showing whether or not a response signal which each terminal transmits is to be received in CoMP reception by multiple base stations including base station 100, information showing the cell ID of base station 100, information showing a resource (for example, PRB) for which a response signal which each terminal transmits, is allocated, and information showing the special ID associated with a CoMP group to which the base station 100 belongs (not shown).

Also, in base station 100 shown FIG. 9, the resource allocation result of downlink data is input to control information generating section 101 and mapping section 104. Also, a coding rate of each terminal of control information to report the resource allocation result of downlink data is input as coding rate information for control information generating section 101 and coding section 102.

Control information generating section 101 generates control information for each terminal to report the resource allocation result of downlink data, and outputs this information to coding section 102. Control information for each terminal includes terminal ID information showing which terminal the control information is addressed to. For example, a CRC bit that is masked by an ID number of a terminal to which control information is sent is included in the control information as terminal ID information.

According to coding rate information received as input, coding section 102 encodes the control information for each terminal and outputs the control information to modulating section 103.

Modulating section 103 modulates the encoded control information and outputs the result to mapping section 104.

On the other hand, coding section 105 encodes transmission data for each terminal (downlink data) and outputs the transmission data to retransmission control section 106.

Upon the initial transmission, retransmission control section 106 holds encoded transmission data for each terminal and outputs the transmission data to modulating section 107. Retransmission control section 106 holds transmission data until ACK from each terminal is input from determination section 118. Also, if NACK from each terminal is input from determination section 118, that is, upon retransmission, retransmission control section 106 outputs transmission data associated with that NACK to modulating section 107.

Modulating section 107 modulates encoded transmission data input from retransmission control section 106 and outputs the result to mapping section 104.

When transmitting control information, mapping section 104 maps control information input from modulating section 103 to physical resources (time and frequency resources) according to the resource allocation result input from control information generating section 101, and outputs the control information to IFFT section 108.

On the other hand, when transmitting downlink data, mapping section 104 maps transmission data for each terminal to physical resources according to the resource allocation result and outputs the transmission data to IFFT section 108. Thus, mapping section 104 maps transmission data for each terminal to either one of a plurality of subcarriers that forms an OFDM symbol according to the resource allocation result.

IFFT section 108 performs an IFFT on a plurality of subcarriers to which control information or transmission data is mapped, generates an OFDM symbol, and outputs the symbol to CP (Cyclic Prefix) adding section 109.

CP adding section 109 attaches a signal that is the same as the tail end part of an OFDM symbol to the beginning of that OFDM symbol as a CP.

Radio transmitting section 110 performs a transmission processing, such as D/A conversion, amplification, and up-conversion for the OFDM symbol with a CP and transmits the symbol to terminal 200 (FIG. 10) through antenna 111.

On the other hand, radio receiving section 112 receives a response signal or a reference signal transmitted from terminal 200 through antenna 111, and performs receiving processing, such as down-conversion and A/D conversion for the response signal or reference signal.

CP removing section 113 removes the CP added to a response signal or reference signal after the receiving processing.

Despreading section 114 despreads a response signal using the blockwise spreading code sequence used for second spreading in terminal 200, and outputs the despread response signal to correlation processing section 116. In the same way, despreading section 114 despreads a response signal using the orthogonal sequence used to spread a reference signal in terminal 200, and outputs the despread reference signal to correlation processing section 116.

Generating section 115 decides whether a response signal to be transmitted from terminal 200 is a response signal to be received in CoMP reception by multiple base stations including base station 100, or is a response signal to be received only by base station 100, and generates a ZAC sequence and frequency hopping pattern based on the decision. For example, if a response signal is to be received in CoMP reception, generating section 115 generates a ZAC sequence and hopping pattern associated with the special ID set for the CoMP group which base station 100 joins. Here, special IDs and hopping patterns set for CoMP groups are associated on a one-by-one basis. That is, the hopping pattern to use for a response signal to be received in CoMP reception is a hopping pattern that is common between a plurality of base stations that receive the response signal in CoMP reception, that is, a common hopping pattern for a plurality of base stations (cells) that belong to the same CoMP group. On the other hand, if a response signal is received only by base station 100, generating section 115 generates a ZAC sequence and hopping pattern associated with the cell ID of base station 100. Generating section 115 outputs the generated ZAC sequence and hopping pattern to correlation processing section 116.

Using the ZAC sequence and hopping pattern input from generating section 115, correlation processing section 116 calculates the correlation value between a despread response signal, a despread reference signal, and the ZAC sequence used for the first spreading in terminal 200. Then, correlation processing section 116 outputs the calculated correlation value to determination section 118 and CoMP control section 117. Here, the cyclic shift amount to use for cyclic shift hopping in each terminal, differs in SC-FDMA units. For this reason, according to the hopping pattern input from generating section 115, correlation processing section 116 extracts a response signal and a reference signal from terminals, from correlation windows which differs per SC-FDMA symbol.

When base station 100 operates as the serving eNB for a terminal having transmitted a response signal (that is, when a terminal which has transmitted a response signal belongs to base station 100), CoMP control section 117 outputs information transmitted from other base stations belonging to the same CoMP group as base station 100 through backhaul (that is, the correlation value of a response signal calculated by other base station), to determination section 118. On the other hand, if base station 100 is not the serving eNB for the terminal which transmitted a response signal (that is, the terminal having transmitted a response signal belongs to another cell), CoMP control section 117 transmits through backhaul the correlation value input from correlation processing section 116 (the correlation value of a response signal which is calculated by base station 100), to other base station belonging to the same CoMP group as base station 100.

Determination section 118 combines the correlation value input from correlation processing section 116 and the correlation value input from CoMP control section 117 (the correlation value of response signals received by other base stations belonging to the same CoMP group as base station 100) by, for example MRC. Then, determination section 118, based on the combination result, decides whether response signals of terminals are ACK or NACK by synchronous detection using the correlation value of a reference signal. Then, determination section 118 outputs ACK or NACK for each terminal to retransmission control section 106.

On the other hand, in terminal 200 shown in FIG. 10, radio receiving section 202 receives through antenna 201 an OFDM symbol transmitted from base station 100, and performs receiving processing, such as down-conversion and A/D conversion for an OFDM symbol.

CP removing section 203 removes CP added to the OFDM symbol after the receiving processing.

FFT (Fast Fourier Transform) section 204 performs an FFT on the OFDM symbol, receives the control information which is mapped to a plurality of subcarriers, or the downlink data, and outputs those to extracting section 205.

Coding rate information showing the coding rate of control information is input to extracting section 205 and decoding section 207.

When receiving the control information, extracting section 205 extracts the control information from a plurality of subcarriers according to coding rate information received as input, and outputs the control information to demodulating section 206.

Demodulating section 206 demodulates the control information and outputs the control information to decoding section 207.

Decoding section 207 decodes the control information according to coding rate information received as input and outputs the control information to determination section 208.

On the other hand, when receiving downlink data, extracting section 205 extracts downlink data which is transmitted to terminal 200 from a plurality of subcarriers according to the resource allocation result input from determination section 208, and outputs the downlink data to demodulating section 210. This downlink data is demodulated in demodulating section 210, decoded in decoding section 211, and input to CRC section 212.

CRC section 212 performs the error detection using a CRC for the decoded downlink data, if the result of CRC is OK (no error), CRC section 212 generates ACK, if the result of CRC is NG (error present), CRC section 212 generates NACK as a response signal, and outputs the generated response signal to modulating section 213. Also, if the result of CRC is OK (no error), CRC section 212 outputs the decoded downlink data as received data.

Determination section 208 performs blind detection to decide whether or not control information input from decoding section 207 is control information for terminal 200. For example, if the result of CRC is OK (no error) by demasking a CRC bit with the ID number of terminal 200, determination section 208 determines that the control information is the control information to terminal 200. Then, determination section 208 outputs to extracting section 205 the control information to terminal 200, that is, the resource allocation result of downlink data to terminal 200.

Also, determination section 208 determines the resource (for example, PUCCH) to be used to transmit a response signal from terminal 200, from the physical resources (time and frequency resources) associated with the subcarrier to which control information to terminal 200 is mapped, and outputs the decision to control section 209.

Control section 209 holds information that is reported in advance from base station 100 to which terminal 200 belongs and that shows whether or not a response signal transmitted from terminal 200 is to be received by multiple base stations in CoMP reception, information that shows the cell ID of the base station to which terminal 200 belongs, information that shows a resource (for example, PRB (Physical Resource Block)) to which a response signal, transmitted by terminal 200, is allocated, and information that shows the special ID associated with the CoMP group when a response signal from terminal 200 is received in CoMP reception.

If a response signal transmitted by terminal 200 is to be received in CoMP reception, control section 209 sets a sequence number and hopping pattern, based on the special ID associated with time and frequency resources used to transmit a response signal (that is, the special ID set for the CoMP group to which multiple base stations belong, multiple base stations including base station 100 to which terminal 200 belongs). Here, the hopping pattern to use if a response signal is to be received in CoMP reception is a hopping pattern that is common between a plurality of base stations which receive a response signal in CoMP reception, that is, a plurality of base stations which belong to the same CoMP group. On the other hand, if a response signal transmitted from terminal 200 is not to be received in CoMP reception, control section 209 sets a sequence number and hopping pattern based on the cell ID reported from base station 100. Also, according to the set sequence number and hopping pattern, control section 209 controls a cyclic shift amount of a ZAC sequence to use for the first spreading in spreading section 214, and a blockwise spreading code sequence to use for second spreading in spreading section 217. The details of a sequence control at control section 209 will be described later. Also, control section 209 outputs a ZAC sequence as a reference signal to IFFT section 220.

Modulating section 213 modulates a response signal input from CRC section 212 and outputs the result to spreading section 214.

Spreading section 214 performs the first spreading on a response signal using a ZAC sequence set by control section 209, and outputs a response signal after the first spreading to IFFT section 215. That is, spreading section 214 performs the first spreading of a response signal according to a sequence and hopping pattern specified from control section 209. Here, since the cyclic shift amount to use for cyclic shift hopping differs per SC-FDMA unit, spreading section 214 performs the first spreading of response signals using different cyclic shift amounts in SC-FDMA symbol units.

IFFT section 215 performs an IFFT to the response signal after the first spreading, and outputs the response signal after the IFFT to CP adding section 216.

CP adding section 216 attaches a signal that is the same as the tail end part of a response signal after an IFFT to the beginning of that response signal as a CP.

Spreading section 217 performs second spreading for the response signal with a CP using a blockwise spreading code sequence set by control section 209, and outputs the response signal after second spreading to multiplexing section 218. That is, spreading section 217 performs second spreading for a response signal after the first spreading using a blockwise spreading code sequence associated with the resource selected at control section 209.

IFFT section 220 performs an IFFT on a reference signal and outputs the reference signal after the IFFT to CP adding section 221.

CP adding section 221 attaches a signal that is the same as the tail end part of an reference signal after an IFFT to the beginning of that reference signal as a CP.

Spreading section 222 spreads the reference signal with a CP using the orthogonal sequence set in advance, and outputs the spread reference signal to multiplexing section 218.

Multiplexing section 218 time-multiplexes a response signal after second spreading and a spread reference signal into one slot, and outputs the results to radio transmitting section 219.

Radio transmitting section 219 performs transmission processing such as D/A conversion, amplification, and up-conversion to a response signal after second spreading and a spread reference signal and transmits through antenna 201 to base station 100 (FIG. 9).

The details of a sequence control and hopping pattern control at control section 209 will be described in the following.

Figure 11A:
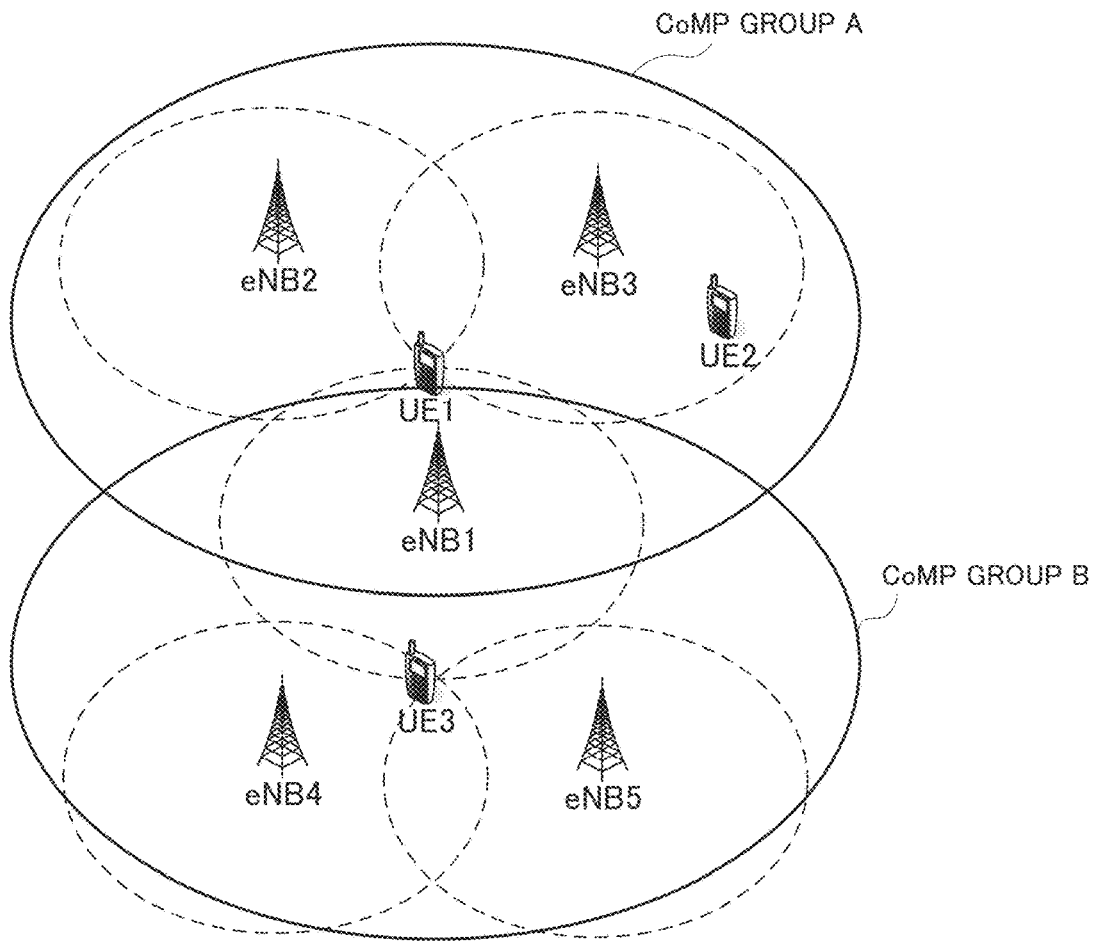
FIG. 11A shows a CoMP group according to embodiment 1 of the present invention.

In the following description, eNB 1-eNB 5 shown in FIG. 11A each have the configuration of base station 100 shown in FIG. 9, and UE 1-UE 3 each have the configuration of terminal 200 shown in FIG. 10. Also, each UE receives downlink data from an eNB to which each UE belongs, and transmits a response signal to that downlink data. As shown in FIG. 11A, among eNB 1-eNB 5, eNB 1-eNB 3 join CoMP group A, and eNB 1, eNB 4, and eNB 5 join CoMP group B. As shown in FIG. 11A, UE 1 belongs to eNB 1, UE 2 belongs to eNB 3, and UE 3 belongs to eNB 4.

Figure 1:
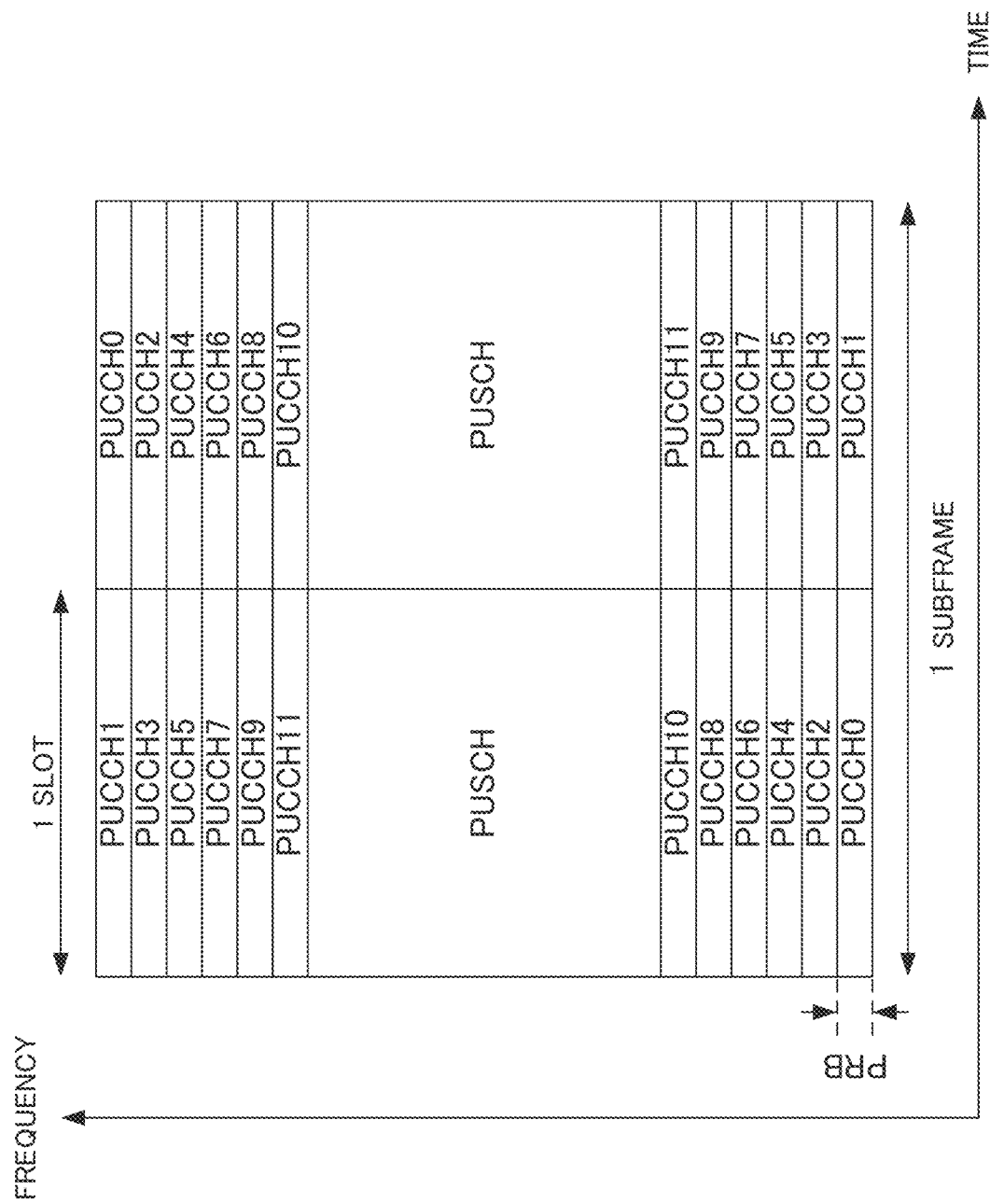
FIG. 1 shows a resource arrangement of PUCCH (prior art)
Figure 2:
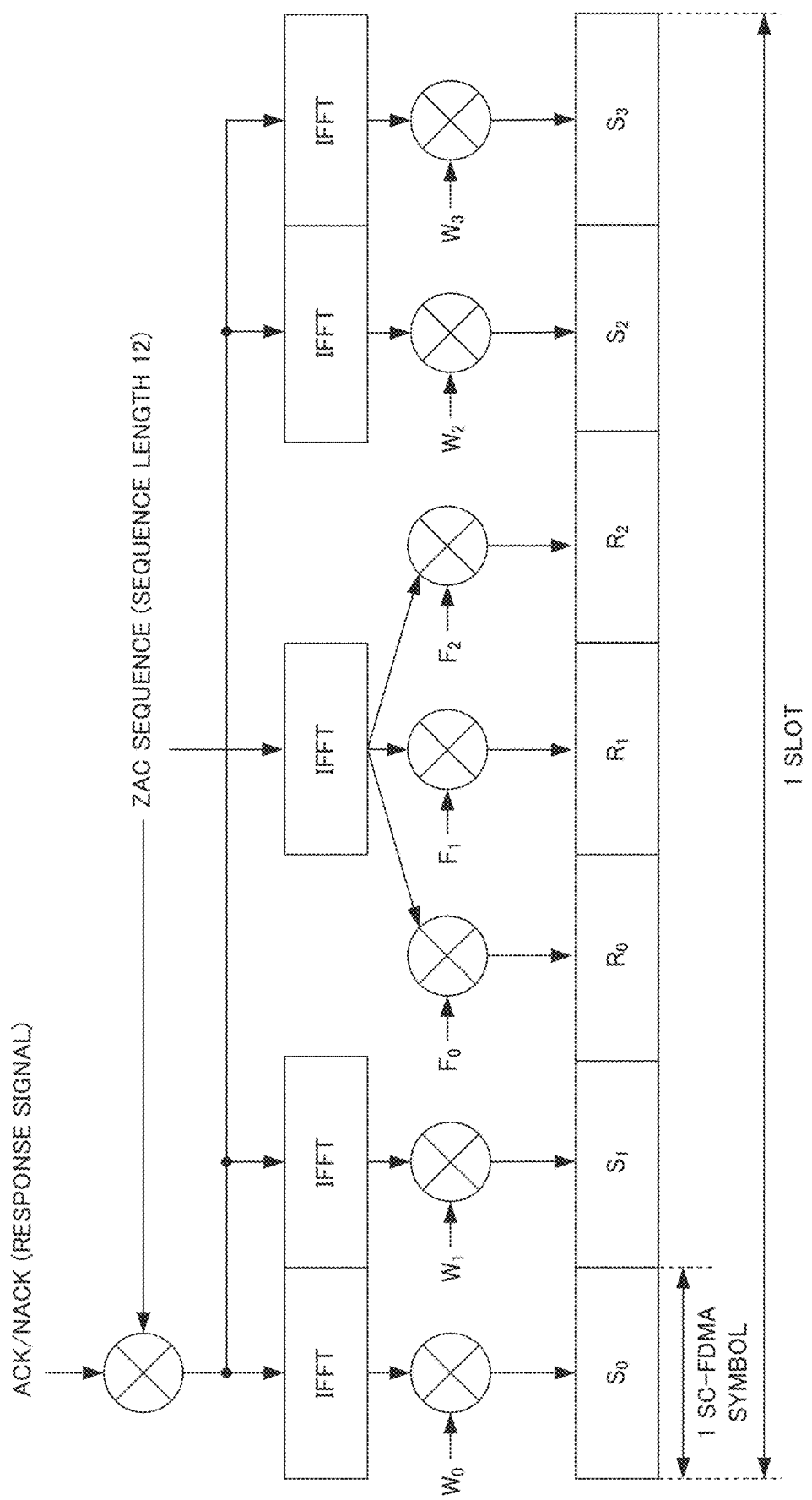
FIG. 2 shows the method of spreading a response signal and a reference signal (prior art)
Figure 3:
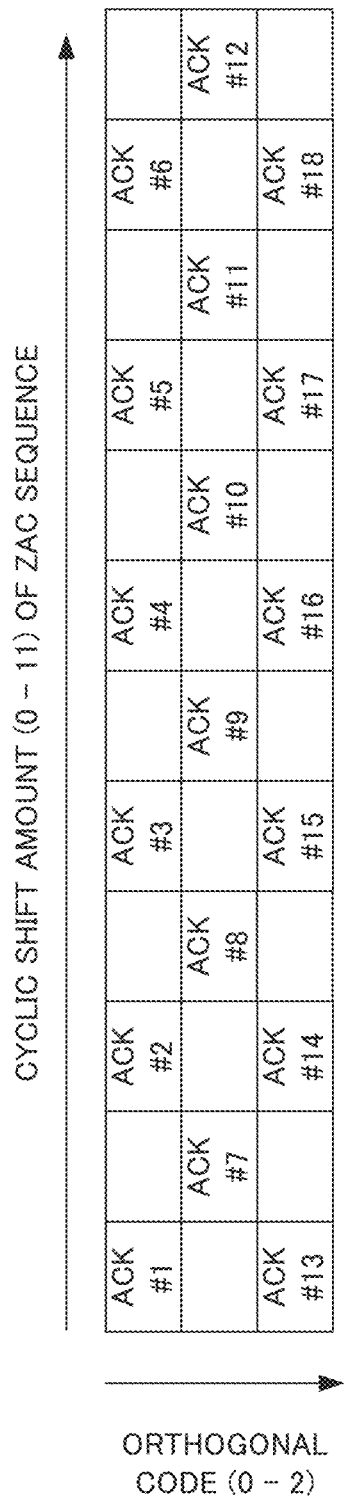
FIG. 3 shows a definition of a response signal (prior art)
Figure 4:
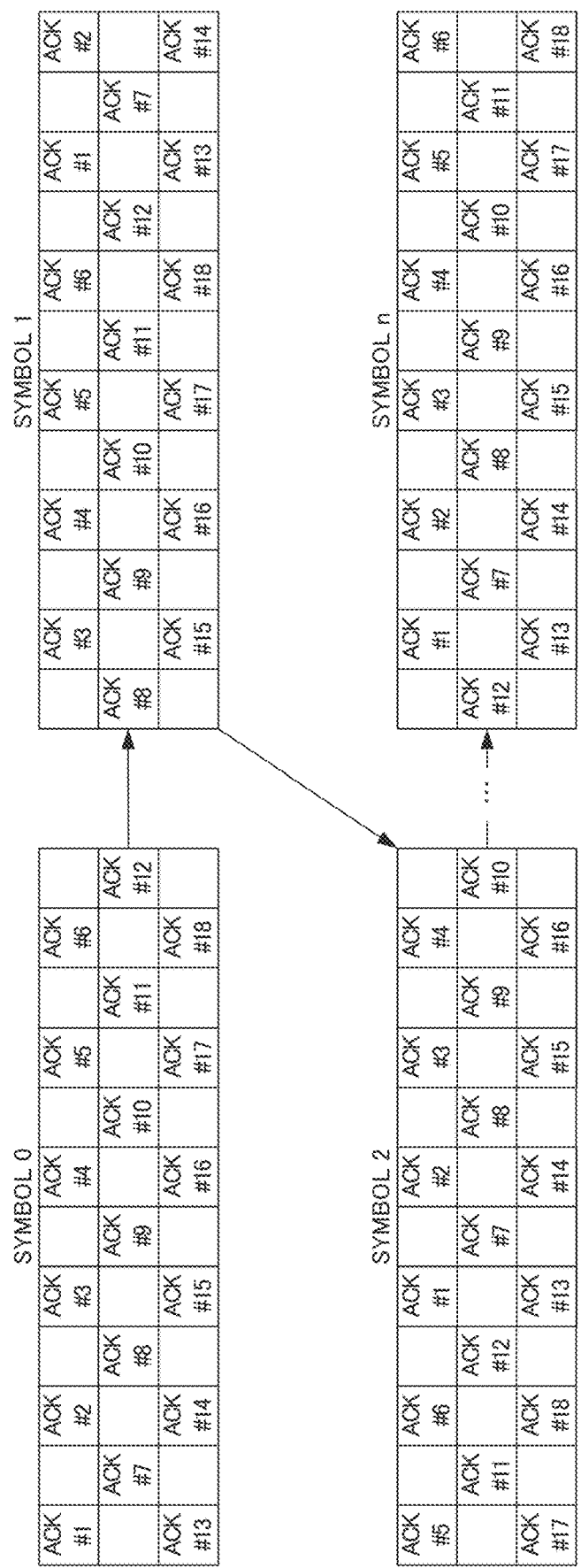
FIG. 4 shows a hopping pattern of a response signal (prior art)
Figure 5:
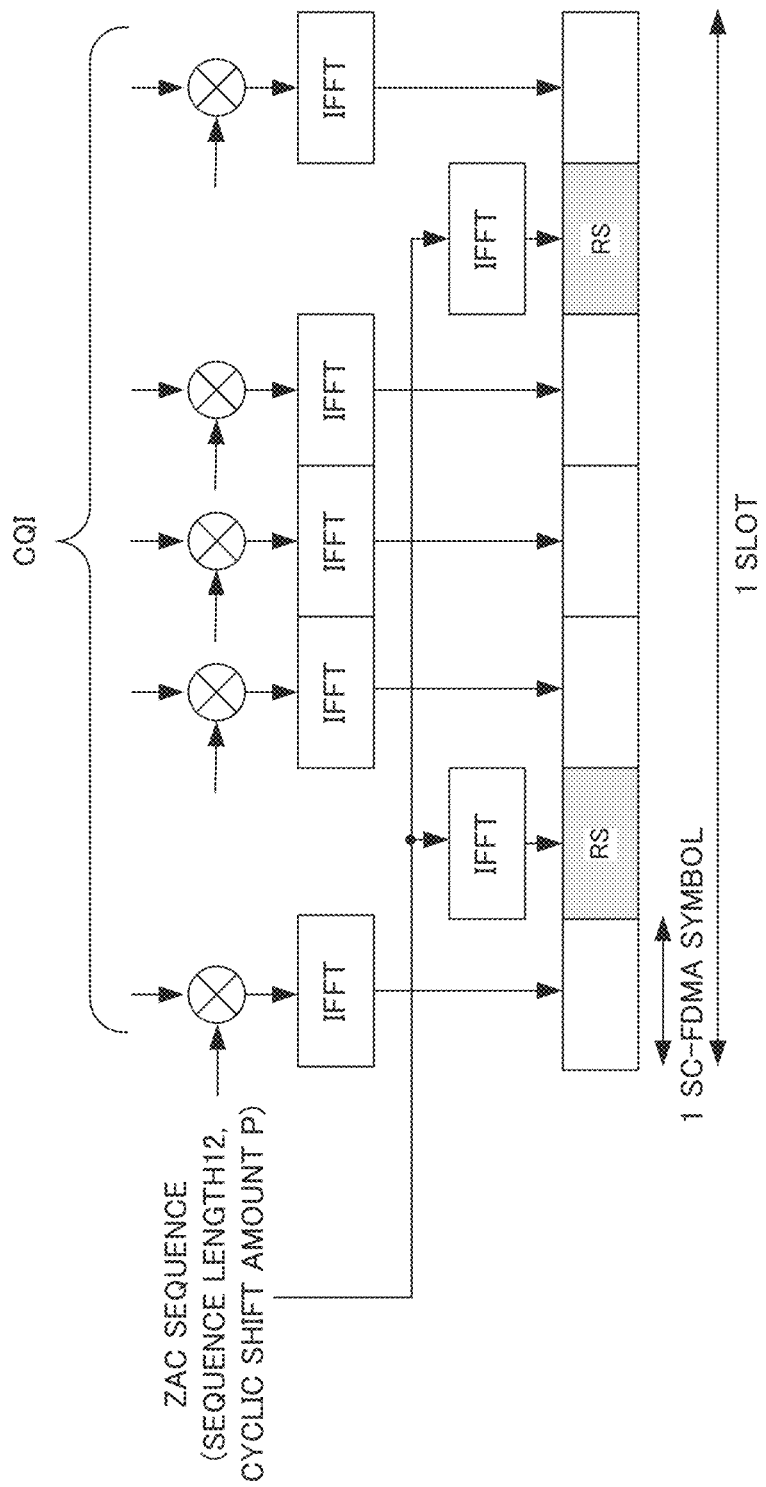
FIG. 5 shows the method to spread a CQI signal and a reference signal (prior art)
Figure 6:
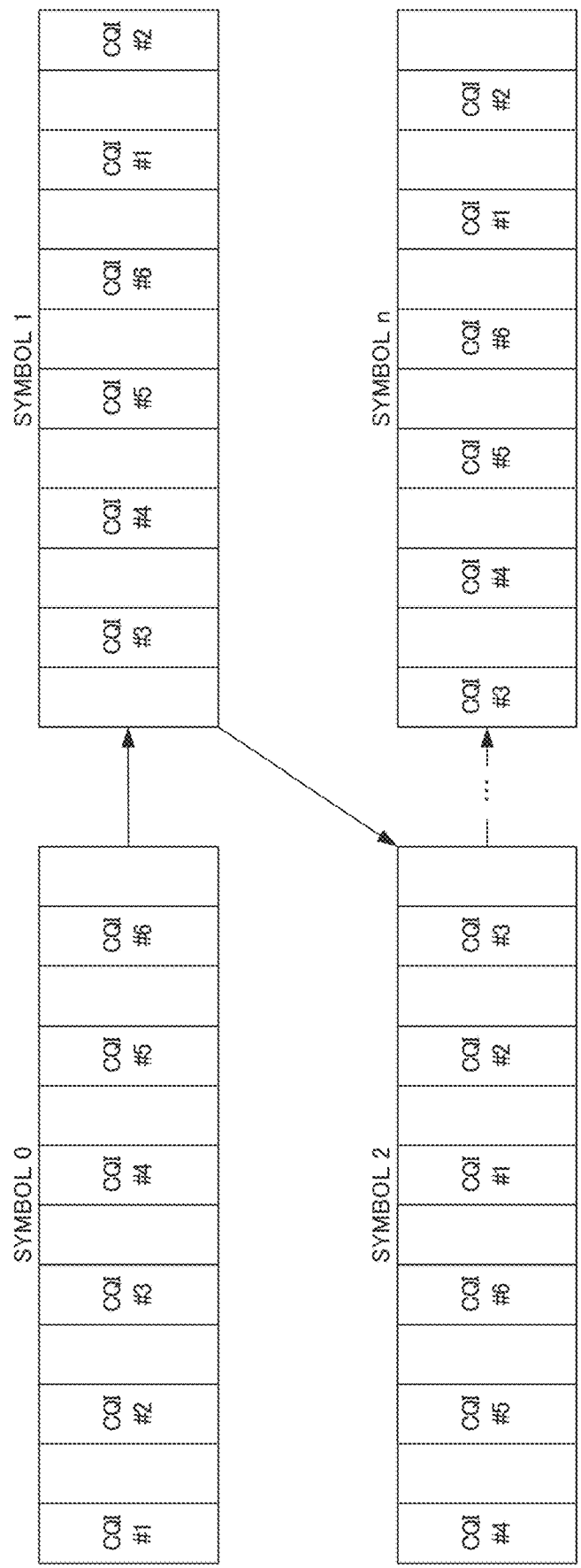
FIG. 6 shows a hopping pattern of a CQI signal (prior art)
Figure 7:
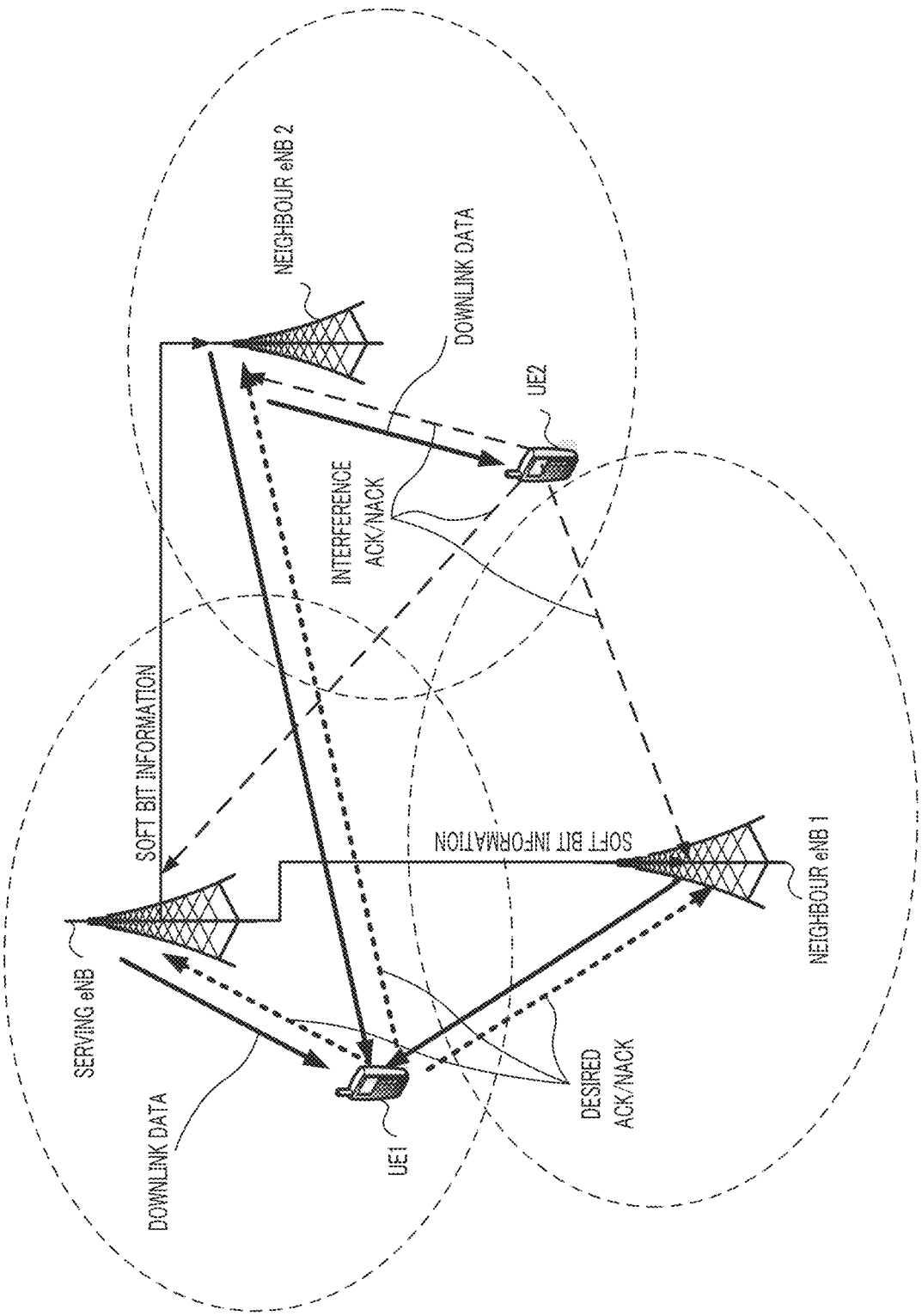
FIG. 7 shows CoMP reception of a response signal (prior art)
Figure 8:
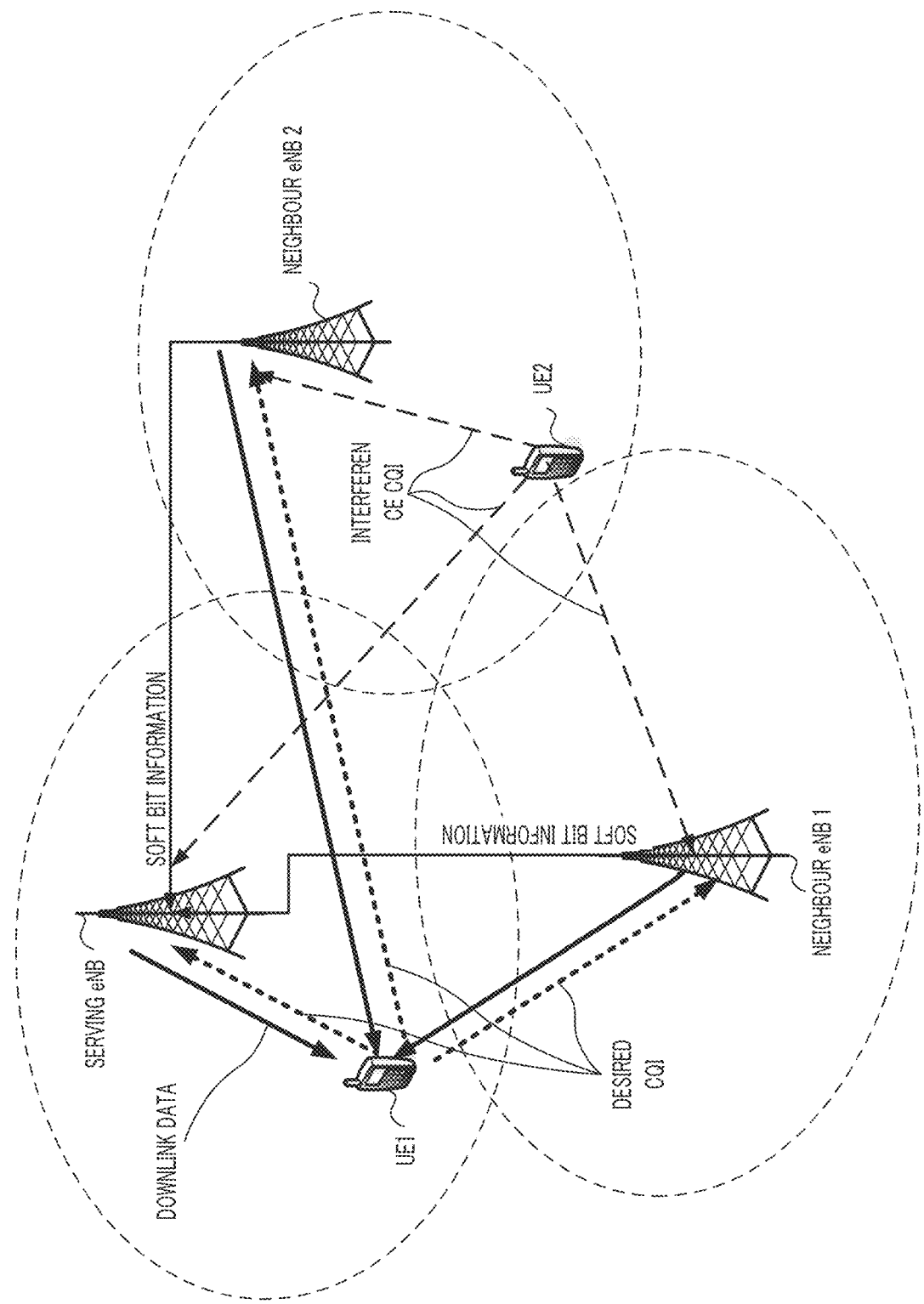
FIG. 8 shows CoMP transmission of a reference signal and CoMP reception of a CQI signal (prior art)
Figure 11B:
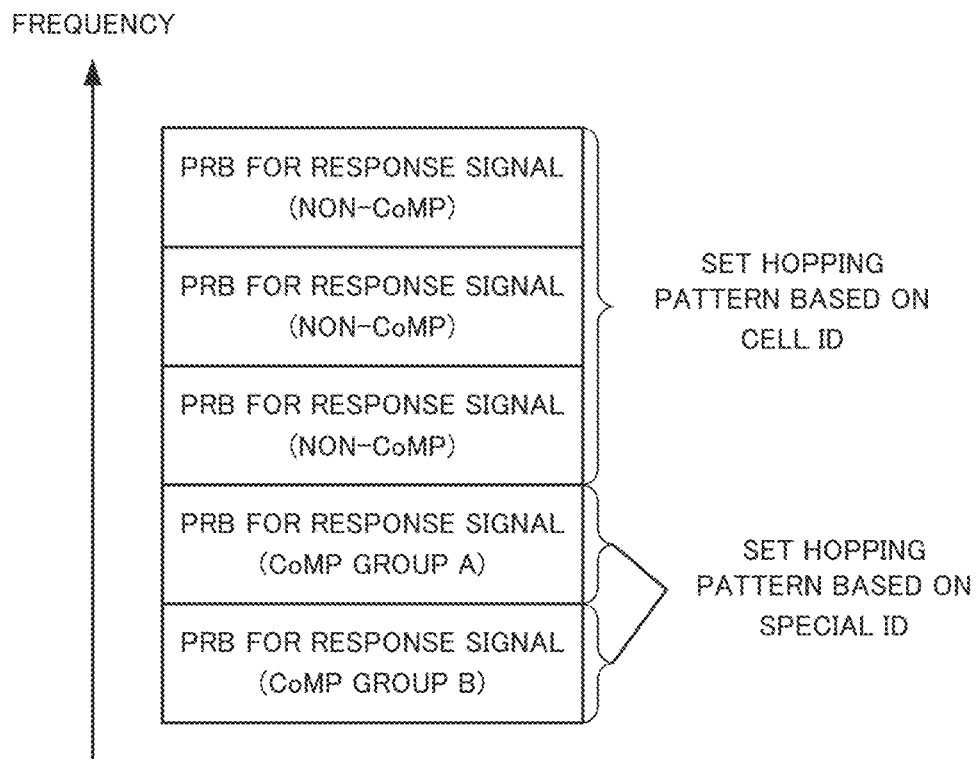
FIG. 11B shows a response signal resource according to embodiment 1 of the present invention.

Also, uplink resources for transmitting a response signal (for example, a plurality of PUCCHs shown in FIG. 1) is represented as a plurality of PRBs (PRB for a response signal), as shown in FIG. 11B. As shown in FIG. 11B, among a plurality of PRBs, some of these PRBs are set on a per CoMP group basis. Also, the special IDs of CoMP groups are associated with PRBs corresponding to CoMP groups.

Thus, eNB 1-eNB 3 joining CoMP group A shown in FIG. 11A have a special ID of CoMP group A, and eNB 1, eNB 4, and eNB 5 joining CoMP group B have a special ID of CoMP group B. A special ID of CoMP group A and PRB for a response signal of CoMP group A shown in FIG. 11B are reported to UE 2 in CoMP group A. A special ID of CoMP group B and PRB for a response signal of CoMP group B shown in FIG. 11B are reported to UE 3 in CoMP group B. Also, eNB 1 joins both CoMP group A and CoMP group B, and has both special IDs of CoMP group A and CoMP group B. However, one UE does not join a plurality of CoMP groups, eNB 1 reports to UE 1 a special ID of any one of CoMP group A or CoMP group B. Here, UE 1 belonging to eNB 1 joins CoMP group A. Thus, a special ID of CoMP group A and PRB for a response signal of CoMP group A shown in FIG. 11B are reported to UE 1.

Thus, if control section 209 of each UE is reported that a response signal which that UE transmits is not to be received in CoMP reception, control section 209 of each UE calculates a spread sequence and hopping pattern of a response signal using the cell ID of an eNB to which that UE belongs. Specifically, in FIG. 11A, UE 1 calculates a spread sequence and hopping pattern associated with the cell ID of eNB 1, UE 2 calculates a spread sequence and hopping pattern associated with the cell ID of eNB 3, and UE 3 calculates a spread sequence and hopping pattern associated with the cell ID of eNB 4.

On the other hand, if control section 209 of each UE is reported a response signal which that UE transmits is to be received in CoMP reception, control section 209 of each UE calculates a spread sequence and hopping pattern of a response signal using the special ID of CoMP group which an eNB, to which that UE belongs, joins. Specifically, in FIG. 11A, UE 1 calculates a spread sequence and hopping pattern associated with the special ID of CoMP group A, UE 2 calculates a spread sequence and hopping pattern associated with the special ID of CoMP group A, and UE 3 calculates a spread sequence and hopping pattern associated with the special ID of CoMP group B.

Each UE allocates a response signal spread using the spread sequence and hopping pattern controlled by control section 209 to the PRB associated with the special ID and transmits this response signal.

Therefore, UEs located in the same CoMP group (UE 1 and UE 2 shown in FIG. 11) spread a response signal using a spread sequence and hopping pattern associated with the same special ID (special ID of CoMP group A). By this means, even UE 1 and UE 2 which are located in the same CoMP group and which belong to mutually different eNBs, spread a response signal using the same spread sequence and hopping pattern. Also, a response signal which UE 1 transmits and a response signal which UE 2 transmits are code-multiplexed with PRBs for CoMP group A shown in FIG. 11B. Thus, at multiple eNBs joining the same CoMP group, response signals that are individually transmitted from UEs belonging respectively the eNBs joining the same CoMP group are received orthogonal to each other in CoMP reception.

By this means, even if the base stations being the serving eNB varies per terminal (that is, even if each terminal belongs to a different base station's cell), it is still possible to code-multiplex response signals in the same PRB. Base stations joining the same CoMP group can receive response signals from each terminal, which are orthogonal to each other, in CoMP reception. Thus, in each base station, each response signal can be decoded without mutual interference.

According to the present embodiment, response signals to be received in CoMP reception by a plurality of base stations are spread using a hopping pattern which is common between a plurality of base stations joining the same CoMP group. Thus, each terminal can make a response signal to be received in CoMP reception in the same CoMP group, be orthogonal to each other, and be code-multiplexed with time and frequency resources (PRBs) used as an uplink control channel. For this reason, a response signal transmitted from each terminal are orthogonal to each other and does not interfere with each other, so that each base station can effectively receive a response signal from each terminal in CoMP reception. Thus, according to the present embodiment, CoMP communication can be performed effectively without increasing an overhead of uplink control channel.

Here, for example, to perform CoMP communication in an uplink control channel (for example, PUCCH), if a base station reports a spread sequence and hopping pattern to use to spread a response signal (that is, a spread sequence and hopping pattern associated with a CoMP group) to each terminal, the amount of signaling of reporting information will increase. However, according to the present embodiment, a special ID is set for each CoMP group, so that, the only reporting information for CoMP communication which a base station has to report to a terminal is the special ID having the same number of bits as the cell ID. Thus, according to the present embodiment, the increase of the amount of signaling of reporting information from a base station to a terminal can be prevented.

Generally, a cell ID is associated with a spread sequence and hopping pattern to be used for a response signal, and furthermore, associated with a set of such as a mapping of PDCCH (an interleave pattern) or a DL RS (Downlink Reference Signal) sequence. Thus, since a cell ID is associated with both uplink and downlink parameters, changing a cell ID might possible influence both uplink and downlink parameters and necessitate numerous changes in the upper layer. On the other hand, with the present embodiment, if a plurality of base stations receive a response signal from a terminal in CoMP reception, a special ID that is associated only with uplink parameters (a spread sequence and hopping pattern of a response signal), that is, an identifier unrelated to downlink parameters, is used. For this reason, according to the present embodiment, a base station can receive a response signal in CoMP reception without affecting a downlink parameter.

Also, each terminal should only control a spread sequence and hopping pattern based on the cell ID or special ID reported from a base station, and does not need to consider which base station the terminal transmits a response signal to. Thus, according to the present embodiment, the terminal can control properly only by receiving information reported from a base station, so that the terminal can be simplified.

The only difference between the present embodiment and 3GPP LTE operation is the usage of a special ID to perform CoMP communication. Thus, a terminal can reuse most parts of 3GPP LTE operation. Thus, according to this embodiment, it is possible to minimize changes in the upper layer and minimize the increase of the amount of signaling of control information to the terminal.

Also, a case has been described with the present embodiment where each terminal receives downlink data from one base station and transmits a response signal to that downlink data. However, in the present invention, each terminal may receive downlink data from a plurality of base stations at the same time. In other words, a plurality of base stations may transmit downlink data to one terminal in CoMP transmission. By this means, a terminal can improve the received quality of downlink data.

(Embodiment 2)

A case has been described with embodiment 1 where multiple base stations receive response signals in CoMP reception. By contrast with this, a case will be described with the present embodiment where a plurality of base stations join the same CoMP group, transmit in CoMP transmission downlink data (a reference signal) to a terminal, and receive in CoMP reception a CQI signal shows the quality of a downlink measured using the downlink data (a reference signal).

The detail will be described in the following. In the following description, a plurality of base stations join the same CoMP group transmit a reference signal and downlink data in CoMP transmission. Thus, reference signals from a plurality of base stations are code-multiplexed and received at a terminal. A base station reports to a terminal in advance information showing a resource (for example, PRB) to be used to transmit a CQI signal.

Figure 12:
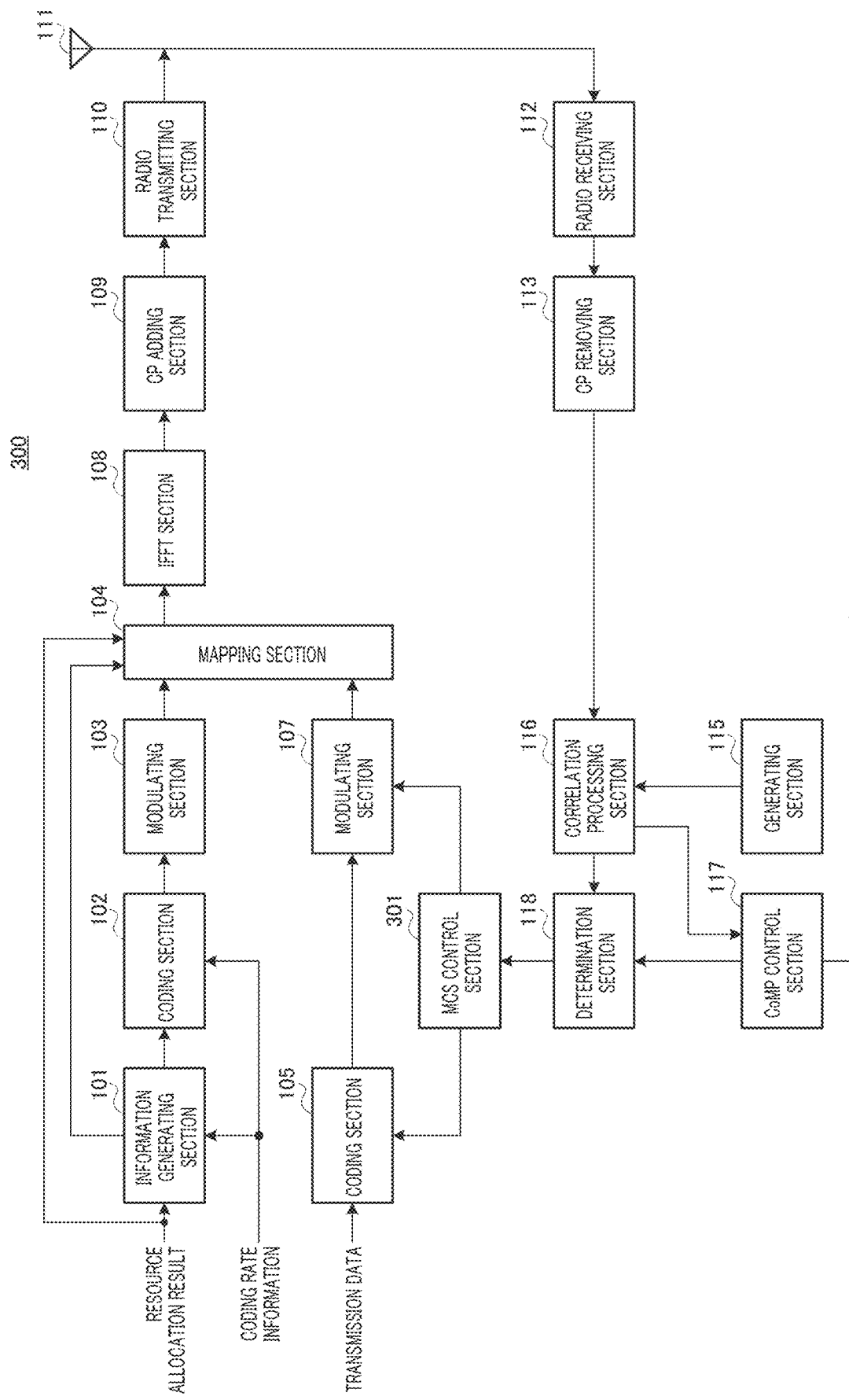
FIG. 12 is a block diagram showing a configuration of a base station according to embodiment 2 of the present invention.
Figure 13:
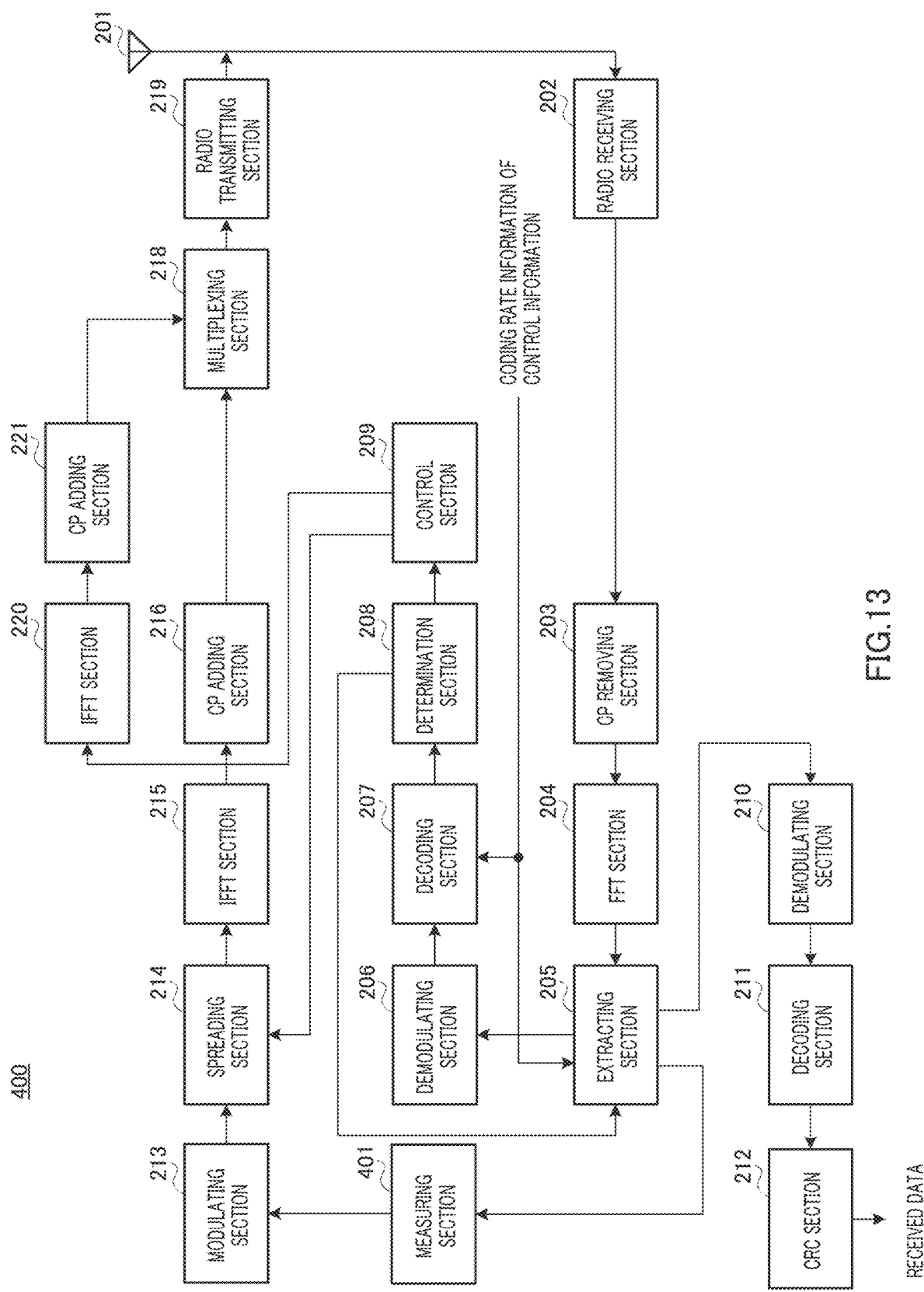
FIG. 13 is a block diagram showing a configuration of a terminal according to embodiment 2 of the present invention.

A configuration of base station 300 according to the present embodiment is shown in FIG. 12, and a configuration of terminal 400 according to the present embodiment is shown in FIG. 13. Parts in FIG. 12 that are the same as in FIG. 9 (Embodiment 1) will be assigned the same reference numerals as in FIG. 9 and overlapping descriptions will be omitted. In the same way, parts in FIG. 13 that are the same as in FIG. 10 (Embodiment 1) will be assigned the same reference numerals as in FIG. 10 and overlapping descriptions will be omitted. As described above, a CQI signal is not subject to second spreading using an orthogonal code sequence (a Walsh sequence or a Fourier sequence), so that, in base station 300 shown in FIG. 12 despreading section 114 shown in FIG. 9 becomes unnecessary and in terminal 400 shown in FIG. 13 spreading section 217 becomes unnecessary.

In base station 300 shown in FIG. 12, analog information of the CQI signals which have been received at other base station joining the same CoMP group as terminal 300, is input to determination section 118 through backhaul from CoMP control section 117. Also, a CQI signal received at terminal 300 is input to determination section 118 from correlation processing section 116. Determination section 118 synthesizes a CQI signal input from correlation processing section 116 and a CQI signal input from CoMP control section 117, and demodulates the CQI signal being the synthesized result.

MCS control section 301 controls a MCS (a coding rate and a modulation scheme) based on CQI information of a plurality of base stations, included in a CQI signal input from determination section 118. MCS control section 301 outputs a controlled coding rate to coding section 105, and outputs a controlled modulation scheme to modulating section 107.

Coding section 105 modulates transmitting data according to a coding rate input from MCS control section 301, and modulating section 107 modulates a coded transmitting date according to a modulation scheme input from MCS control section 301.

On the other hand, in terminal 400 shown in FIG. 13, extracting section 205 extracts a reference signal transmitted in CoMP transmission from a plurality of base stations joining the same CoMP group (a signal in which reference signals from each base station are code-multiplexed) to measuring section 401.

Measuring section 401 uses a reference signal input from extracting section 205 and measures downlink quality between terminal 400 and each base station respectively. Here, it is difficult to make CQI information showing downlink quality for each of a plurality of base stations separately arrive at all base stations joining the CoMP group. Then, measuring section 401 groups CQI information showing downlink quality for measured multiple base stations, for example to one CQI signal. Measuring section 401 outputs a CQI signal including CQI information of a plurality of base stations to modulating section 213.

Control section 209 of terminal 400 according to the present embodiment will be described in the following.

Figure 14A:
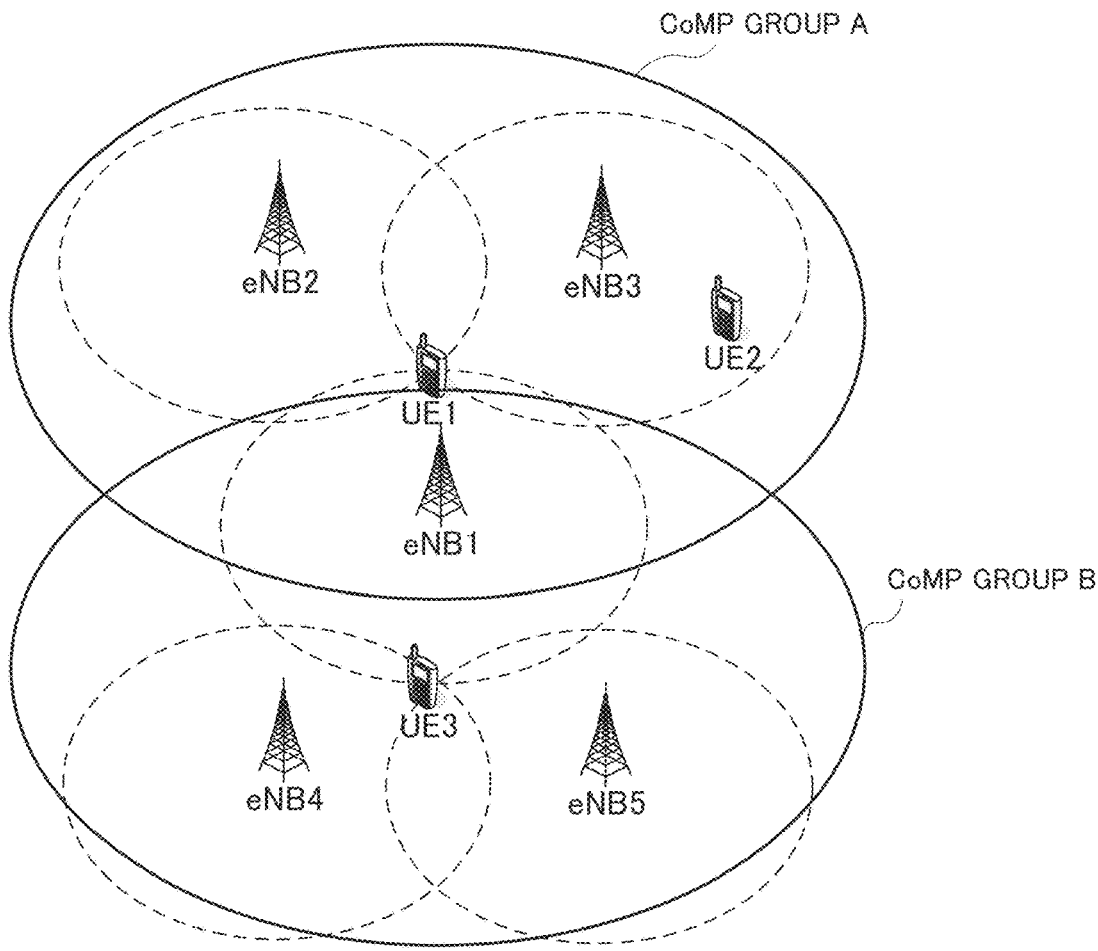
FIG. 14A shows a CoMP group according to embodiment 2 of the present invention.

In the following description, a case will be described using as shown in FIG. 14A, the same eNBs and UEs as eNB 1-eNB 5 and UE 1-UE 3 shown in FIG. 11A. Also, eNB 1-eNB 5 shown in FIG. 14A each have the configuration of base station 300 shown in FIG. 12, and UE 1-UE 3 each have the configuration of terminal 400 shown in FIG. 13. Also, each UE receives a reference signal from a plurality of eNBs join the CoMP group including an eNB to which that UE belongs, and transmits a measured CQI signal by using the reference signal. Thus, in FIG. 14A, UE 1 receives reference signals from eNB 1-eNB 3 join CoMP group A, UE 2 receives reference signals from eNB 1-eNB 3 join CoMP group A, and UE 3 receives reference signals from eNB 1, eNB 4, and eNB 5 join CoMP group B. In other words, eNB 1-eNB 3 joining CoMP group A transmit reference signals to UE 1 and UE 2 in CoMP transmission, and eNB 1, eNB 4, and eNB 5 joining CoMP group B transmit reference signals to UE 3 in CoMP transmission.

Figure 14B:
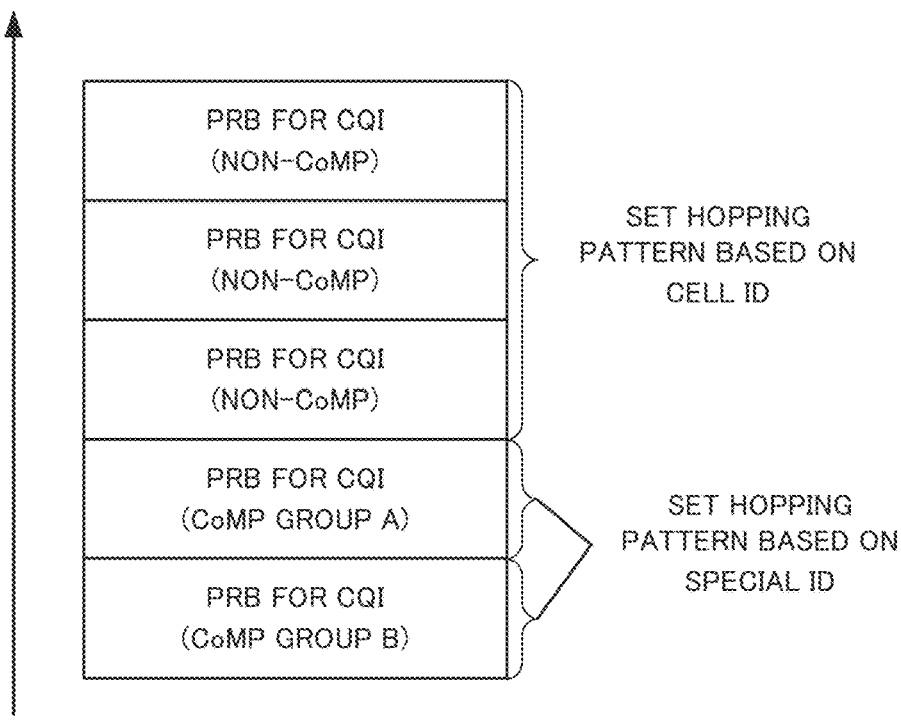
FIG. 14B shows a CQI signal resource according to embodiment 2 of the present invention.

Also, uplink resources for transmitting a CQI signal (for example, a plurality of PUCCHs shown in FIG. 1) is represented as a plurality of PRBs (PRBs for a CQI signal), as shown in FIG. 14B. As shown in FIG. 14B, similar to embodiment 1, among a plurality of PRBs, some PRBs of these PRBs are set on a per CoMP group basis. Also, the special IDs of CoMP groups are associated with PRBs corresponding to CoMP groups.

For this reason, similar to embodiment 1, if control section 209 of each UE is reported that a CQI signal which that UE transmits is not received in CoMP reception, control section 209 of each UE calculates a spread sequence and hopping pattern of a CQI signal using the cell ID of an eNB to which that UE belongs.

Also, similar to embodiment 1, if control section 209 of each UE is reported that a CQI signal which that UE transmits is to be received in CoMP reception, control section 209 of each UE calculates a spread sequence and hopping pattern of a CQI signal using a special ID of the CoMP group an eNB to which that UE belongs joins.

By this means, similar to embodiment 1, CQI signals transmitted from UEs joining the same CoMP group and belonging to mutually different eNBs, are received in CoMP reception orthogonally to each other.

Thus, even if the terminals belong to mutually different base station cells, it is still possible to code-multiplex CQI signals in the same PRB. Thus, base stations joining the same CoMP group can receive CQI signals from terminals, which are orthogonal to each other, in CoMP reception.

Therefore, according to the present embodiment, CQI signals to be received in CoMP reception at a plurality of base stations are spread using a hopping pattern which is common between a plurality of base stations joining the same CoMP group. Thus, each terminal can make a CQI signal to be received in CoMP reception in the same CoMP group, be orthogonal to each other, and be code-multiplexed with time and frequency resources (PRBs) used as an uplink control channel. For this reason, a CQI signal transmitted from each terminal are orthogonal to each other and does not interfere with each other, so that each base station can effectively receive the CQI signal from each terminal in CoMP reception. Thus, according to this embodiment, even if a CQI signal is to be received in CoMP reception, the same advantage result can be achieved as embodiment 1. By this means, in a base station, CoMP reception improves the receiving quality of a CQI signal, so that the throughput of downlink CoMP transmission can be improved using more accurate CQI information.

(Embodiment 3)

Assuming that slot synchronization is established between multiple base stations joining the same CoMP group cases have been described with embodiment 1 and embodiment 2 where slot numbers match between all the base stations joining the same CoMP group. By contrast with this, a case where slot synchronization is not established between multiple base stations joining the same CoMP group—that is, a case where slot numbers do not match between all the base stations joining the same CoMP group—will be described with the present embodiment.

Here, a hopping pattern of a control signal (a response signal or a CQI signal) is defined by cyclic shifting for each slot a resource arrangement of a control channel (PUCCH) for a control signal on a cyclic shift axis. Then, a base station and a terminal according to the present embodiment adjust a hopping pattern showing correspondence between a resource arrangement and slot numbers of multiple control channels on a cyclic shift axis, using the difference between slot numbers of multiple base stations.

The detail will be described in the following. As embodiment 1 and embodiment 2, a base station according to the present embodiment reports to a terminal, the cell ID of the base station, time and frequency resources (for example, PRBs) to transmit a control signal (a response signal or a CQI signal), and a special ID associated with the CoMP group which the base station joins. In addition to the above, a base station according to the present embodiment reports the difference between the slot number of a specific base station (for example, a serving eNB of a certain terminal) between multiple base stations including the base station which join a CoMP group, and the slot number of the base station, as a tentative slot number (hereinafter referred to as "special slot number"). That is, based on the slot number at a specific base station, a plurality of base stations joining a CoMP group calculates the difference between the basic slot number and the slot number of each base station as a special slot number. Then, each base station reports a special slot number for the terminal belonging to the base station.

If a control signal (a response signal or a CQI signal) which the terminal according to the present embodiment (for example, control section 209 shown in FIG. 10 and FIG. 13) transmits is to be received in CoMP reception, the terminal calculates a spread sequence and hopping pattern using the reported special ID of the CoMP group, the slot number and special slot number of the base station to which the terminal belongs. Specifically, as embodiment 1 and embodiment 2, a terminal calculates a spread sequence and hopping pattern of a control signal using a special ID. Here, to have the same resource arrangement of the slot number of the basic base station, a terminal shifts the slot number of the base station to which the terminal belongs, through a reported special slot number (that is, apply a shift to match the difference between the slot number in the reference base station and the slot number of the base station to which the terminal belongs) and uses the hopping pattern of the slot number found there. Therefore, a terminal adjusts the calculated hopping pattern.

By this means, all cells joining a CoMP group can perform CoMP communication using the same hopping pattern as the hopping pattern at the slot number of the base station which becomes the basic.

Thus, according to the present embodiment, even if a slot synchronization between multiple base stations joining CoMP group is not established, the same result can be acquired as embodiment 1 and embodiment 2.

The embodiments of the present invention have been explained in the above.

Cases have been described with the above embodiments where a response signal (ACK/NACK) or a CQI signal is received in an uplink in CoMP reception. However, in the present invention, a signal to be received as a CoMP reception is not limited to a CQI signal and a response signal. The present invention is equally applicable to, for example, RI (Rank Indicator) showing the number of Rank in a downlink channel matrix, or SR (Scheduling Request) to report a base station that transmitting data is generated on a terminal side.

Cases have been described with the above embodiments where a special ID is set as a unique parameter associated with a CoMP PRB. However, in the present invention, as a unique parameter associated with a CoMP PRB, for example, a unique power control parameter can be set in addition to the special ID. Thus, a base station can report for a terminal the special ID and the power control parameter associated with a CoMP PRB.

Also, the PUCCH used in the above embodiments is a channel to feed back a response signal (ACK or NACK), so that is referred as an ACK/NACK channel.

A terminal may be referred to as a terminal station, UE, MT, MS, and STA (Station). A base station may be referred to as Node B, BS, and AP. A subcarrier may be referred to as a tone. A CP may be referred to as a guard interval (GI).

The method of error detection is not limited to a CRC check.

The method of exchanging between a frequency domain and a time domain is not limited to an IFFT and a FFT.

Embodiments mentioned above explain examples when the present invention is performed by hardware, but the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No.2008-314791, filed on Dec. 10, 2008, including the specification, drawings and abstract, is incorporated herein by reference in its entirety.

INDUSTRIAL APPLICABILITY

The present invention can be applied to such as a mobile communication system.

The invention claimed is:

1. A base station among a plurality of base stations, which perform a coordinated multipoint (CoMP) transmission and reception and each of which has a first identity specific to a cell, the base station comprising:
a transmitter, which, in operation, transmits, to a terminal, a first identity specific to a cell, and transmits, to the terminal, a second identity set independently of the first identity; and
a receiver, which, in operation, receives, from the terminal, a response signal generated using a sequence defined by one of a plurality of cyclic shifts, wherein said one of the plurality of cyclic shifts varies between symbols according to a cyclic shift hopping pattern set based on the second identity.

2. The base station according to claim 1, wherein the cyclic shift hopping pattern is common between the plurality of base stations.

3. The base station according to claim 1, wherein, using a difference between slot numbers in the plurality of base stations, the cyclic shift hopping pattern is adjusted.

4. The base station according to claim 1, wherein, the cyclic shift hopping pattern is adjusted using a difference between a slot number in the base station and a slot number in another base station among the plurality of base stations.

5. The base station according to claim 1, wherein the second identity is common between the plurality of base stations.

6. The base station according to claim 1, wherein the cyclic shift hopping pattern is set based on one of the first identity and the second identity according to a signaling from at least one of the plurality of base stations.

7. The base station according to claim 1, wherein a number of bits in the first identity is same as that in the second identity.

8. The base station according to claim 1, wherein the second identity is not related to a parameter of a downlink.

9. The base station according to claim 1, wherein the second identity is related to a resource used for transmission of the response signal.

10. A communication method by a base station among a plurality of base stations, which perform a coordinated multipoint (CoMP) transmission and reception and each of which has a first identity specific to a cell, the communication method comprising:
transmitting, to a terminal, a first identity specific to a cell, and transmitting, to the terminal, a second identity set independently of the first identity; and
receiving, from the terminal, a response signal generated using a sequence defined by one of a plurality of cyclic shifts, wherein said one of the plurality of cyclic shifts varies between symbols according to a cyclic shift hopping pattern set based on the second identity.

11. The method according to claim 10, wherein the cyclic shift hopping pattern is common between the plurality of base stations.

12. The method according to claim 10, wherein, using a difference between slot numbers in the plurality of base stations, the cyclic shift hopping pattern is adjusted.

13. The method according to claim 10, wherein, the cyclic shift hopping pattern is adjusted using a difference between a slot number in the base station and a slot number in another base station among the plurality of base stations.

14. The method according to claim 10, wherein the second identity is common between the plurality of base stations.

15. The method according to claim 10, wherein the cyclic shift hopping pattern is set based on one of the first identity and the second identity according to a signaling from at least one of the plurality of base stations.

16. The method according to claim 10, wherein a number of bits in the first identity is same as that in the second identity.

17. The method according to claim 10, wherein the second identity is not related to a parameter of a downlink.

18. The method according to claim 10, wherein the second identity is related to a resource used for transmission of the response signal.

* * * * *